US008184038B2

(12) United States Patent  
Ekbal et al.

(10) Patent No.: US 8,184,038 B2
(45) Date of Patent: May 22, 2012

(54) TWO-WAY RANGING WITH INTER-PULSE TRANSMISSION AND RECEPTION

(75) Inventors: Amal Ekbal, San Diego, CA (US); David Jonathan Julian, San Diego, CA (US); Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 12/402,420

(22) Filed: Mar. 11, 2009

(65) Prior Publication Data

US 2010/0045508 A1 Feb. 25, 2010

Related U.S. Application Data

(60) Provisional application No. 61/090,329, filed on Aug. 20, 2008.

(51) Int. Cl.
*G01S 13/42* (2006.01)
(52) U.S. Cl. ........ 342/109; 342/118; 342/125; 342/450; 455/404.2; 455/456.1
(58) Field of Classification Search .............. 342/125, 342/118, 109, 145, 450, 451, 457, 458; 455/404.2, 455/456.1, 456.2, 456.3, 456.5
See application file for complete search history.

(56) References Cited

U.S. PATENT DOCUMENTS

| | | | | |
|---|---|---|---|---|
| 7,103,365 B2* | 9/2006 | Myllymaki | ............. | 455/456.1 |
| 7,463,194 B1* | 12/2008 | Sahinoglu | ............. | 342/458 |
| 7,525,484 B2* | 4/2009 | Dupray et al. | ............. | 342/450 |
| 7,995,644 B2* | 8/2011 | Sahinoglu et al. | ............. | 375/221 |
| 8,014,425 B2* | 9/2011 | Ekbal et al. | ............. | 370/517 |
| 2001/0022558 A1* | 9/2001 | Karr et al. | ............. | 342/450 |
| 2004/0198386 A1* | 10/2004 | Dupray | ............. | 455/456.1 |
| 2005/0026563 A1 | 2/2005 | Leeper | | |
| 2007/0249288 A1* | 10/2007 | Moallemi et al. | ............. | 455/68 |
| 2007/0252724 A1* | 11/2007 | Donaghey et al. | ............. | 340/905 |
| 2007/0285306 A1* | 12/2007 | Julian et al. | ............. | 342/118 |
| 2008/0259896 A1* | 10/2008 | Sahinoglu et al. | ............. | 370/345 |
| 2008/0291017 A1* | 11/2008 | Yermal et al. | ............. | 340/541 |
| 2010/0045508 A1* | 2/2010 | Ekbal et al. | ............. | 342/145 |
| 2010/0090901 A1* | 4/2010 | Smith et al. | ............. | 342/451 |

(Continued)

FOREIGN PATENT DOCUMENTS

DE 4421349 10/1995

(Continued)

*Primary Examiner* — John Sotomayor
(74) *Attorney, Agent, or Firm* — Dang M. Vo; Paul S. Holdaway

(57) ABSTRACT

Relatively short turnaround times are provided in conjunction with two-way ranging to, for example, facilitate accurate ranging measurements when the relative clock drift between ranging nodes (e.g., devices) is relatively high. In some aspects, relatively short turnaround times are achieved through the use of a symmetric channel that is defined to enable concurrent transmission of ranging messages between nodes. For example, a symmetric channel may be established by configuring the nodes to receive one or more pulses associated with a received ranging message in between pulse transmissions associated with a transmitted ranging message. In this way, one node may send a ranging timestamp shortly after the other nodes sends its ranging timestamp, thereby mitigating the impact of the clock drift on the ranging measurements. In some aspects the pulses may comprise ultra-wideband pulses. The techniques described herein may be employed to provide two-way ranging in, for example, low power and/or non-coherent wireless devices.

104 Claims, 12 Drawing Sheets

U.S. PATENT DOCUMENTS

| | | | |
|---|---|---|---|
| 2010/0128617 A1* | 5/2010 | Aggarwal et al. | 370/252 |
| 2010/0150117 A1* | 6/2010 | Aweya et al. | 370/338 |
| 2010/0194594 A1* | 8/2010 | Donaghey et al. | 340/905 |
| 2010/0201573 A1* | 8/2010 | Lamming | 342/451 |

FOREIGN PATENT DOCUMENTS

| | | |
|---|---|---|
| WO | WO03077432 | 9/2003 |
| WO | WO2007121488 | 10/2007 |

* cited by examiner

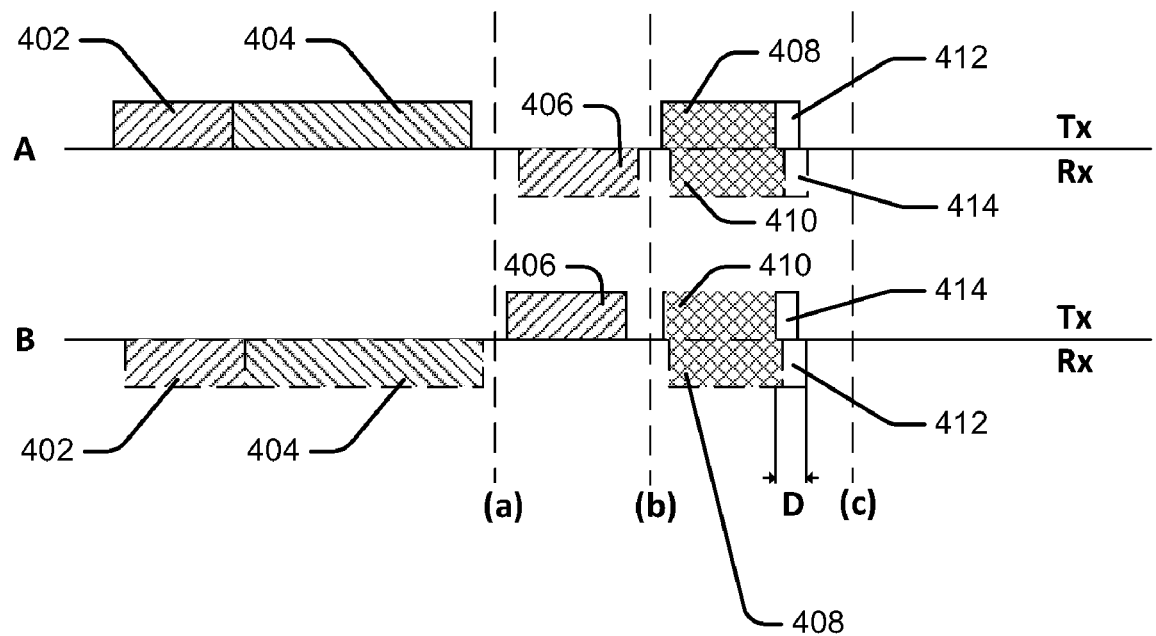
FIG. 4

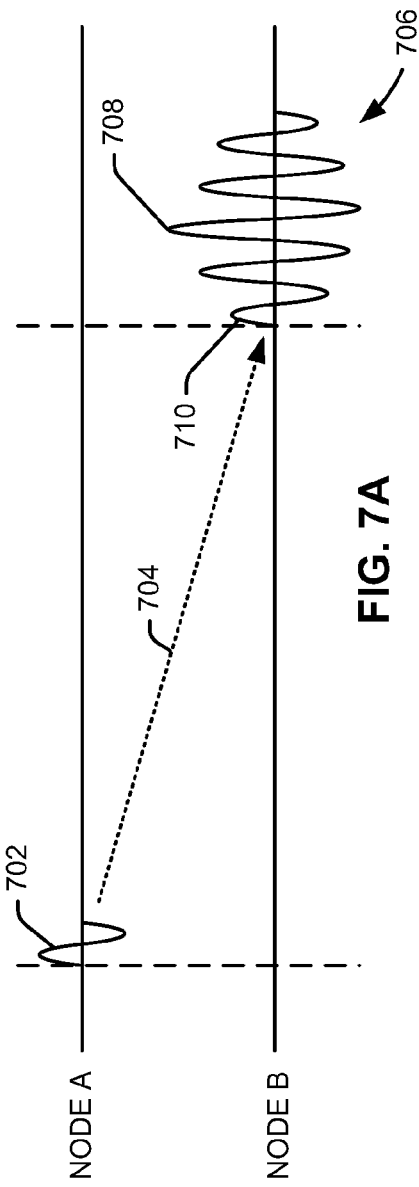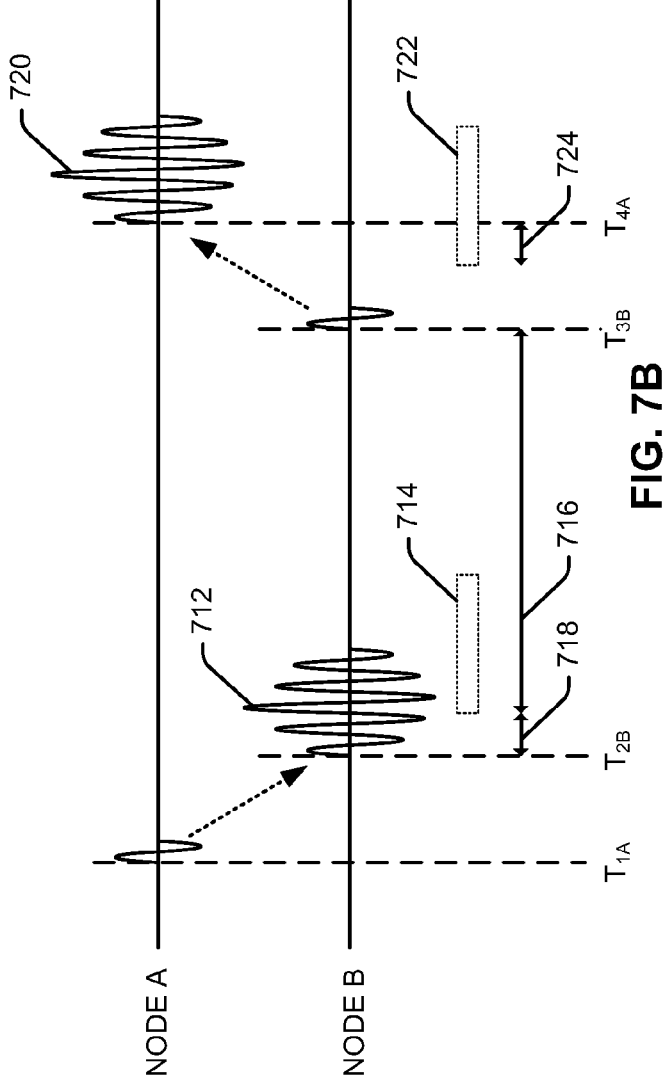

TWO-WAY RANGING WITH INTER-PULSE TRANSMISSION AND RECEPTION

CLAIM OF PRIORITY

This application claims the benefit of and priority to commonly owned U.S. Provisional Patent Application No. 61/090,329, filed Aug. 20, 2008, the disclosure of which is hereby incorporated by reference herein.

BACKGROUND

1. Field

This application relates generally to wireless technology and more specifically, but not exclusively, to two-way ranging.

2. Introduction

Distance ranging involves determining a distance between two locations. In a typical scenario, a ranging device such as a rangefinder measures a distance from the rangefinder to another object. Here, the ranging device may determine the amount of time it takes for a signal to travel between the ranging device and another device. The ranging device may then calculate the distance between the devices based on the signal propagation time and the known propagation speed of the signal (e.g., the speed of light). A distance ranging device may employ a variety of technologies such as laser, radar, sonar, and various forms of radio-frequency ("RF") signaling. For convenience, the term distance ranging will be referred to herein simply as ranging.

In some cases, a two-way ranging technique may be employed to determine the distance between two devices. FIG. 1 illustrates a simplified example of ranging signal timing for two nodes (e.g., wireless devices) involved in a ranging operation. Here, a node A measures the distance to a node B based on a round-trip time associated with signals transmitted by each of the nodes. For convenience, the signals of FIG. 1 are depicted in a simplified form. A signal 102 transmitted by node A (as represented by arrow 104) is received at node B as signal 106 after a propagation time represented by time period 108. After receiving the signal 106, node B transmits a signal 112 (as represented by arrow 114) that is received at node A as signal 116 after a propagation time represented by time period 118. Each node generates a timing indication (hereafter referred to as a timestamp) associated with the transmission and reception of these signals. In conjunction with their respective transmission operations, node A may use a clock designated clock A and node B may use a clock designated clock B. In operation, there may be an offset $T_0$ between these clocks. Given the transmit timestamps at nodes A and B ($T_{1A}$ and $T_{3B}$, respectively) and the receive timestamps at nodes A and B ($T_{4A}$ and $T_{2B}$, respectively), an estimated propagation delay $T_p$ (e.g., corresponding to time period 108 or 118) may be computed without knowing the unknown clock offset $T_0$. For example, a round-trip time estimate may be determined according to: $2T_p = (T_{4A} - T_{1A}) - (T_{3B} - T_{2B})$. Here, $T_{1A}$, $T_{2B}$, $T_{3B}$, and $T_{4A}$ are measurable. Thus, by providing node A with the turnaround time of node B (represented by time period 110), node A may calculate the round-trip time based on the time period between the transmission of the signal 102 and reception of the signal 116 (represented by time period 120) and the turnaround time.

FIG. 2 illustrates a more detailed example of how a two-way message exchange scheme may be employed to measure the relative distance between two nodes A and B. In this example, transmission by a given node is represented by the blocks above the horizontal line shown for that node, while reception by a given node is represented by the blocks below the horizontal line. Here, the transmission of a ranging packet by node A is represented by the blocks 202 and the reception of that packet by node B is represented by the blocks 204. Similarly, the transmission of a reply ranging packet by node B is represented by the blocks 206 and the reception of that packet by node A is represented by the blocks 208. Each ranging packet may include an acquisition preamble (e.g., used by a receiving node to initially acquire the timing of messages from a transmitting node), a ranging preamble (e.g., used to acquire more precise timing and to estimate a line-of-sight path for ranging operations), and a timestamping symbol (e.g., corresponding to timestamps $T_{1A}$, $T_{2B}$, $T_{3B}$, and $T_{4A}$ discussed above). The reply packet may indicate the amount of time it took node B to transmit the reply packet after receiving the ranging packet (e.g., node B may send an indication of its turnaround time). Accordingly, node A may use this turnaround time to determine the actual propagation time of the packets. For example, node A calculates the total round-trip time as the amount of time that elapsed from the time it transmitted its ranging packet (e.g., timestamp $T_{1A}$) to the time it received the reply packet (e.g., timestamp $T_{4A}$). Node A may then determine the actual propagation time by subtracting the turnaround time from the total round-trip time.

In practice, the timing of the clocks used by the two nodes (e.g., clocks A and B) may drift with respect to an ideal clock. If the drifts for clocks A and B are $\beta_A$ and $\beta_B$, respectively, the estimated propagation delay $T'_p$ may have an error given by Equation 1 where D represents the effective reply time (e.g., the turnaround time 110).

$$T'_p = (1+\beta_A)T_p + (\beta_A - \beta_B)D/2 \qquad \text{EQUATION 1}$$

Typically, the effective reply time D is relatively large (e.g., on the order of milliseconds). If D=5 milliseconds and the required timing accuracy is 1 nanosecond, the residual clock drift may need to be less than 0.4 parts-per-million ("ppm"). This accuracy may be obtainable through the use of a sufficiently complex tracking mechanism. For example, drift accuracy on the order of 1 ppm or less may be achieved in a moderate power coherent radio, such as an IEEE 802.15.4a Zigbee radio. However, in an ultra-low power non-coherent radio (e.g., that uses $\frac{1}{10}^{th}$ the power of a moderate power radio), this level of drift accuracy may be difficult to achieve.

SUMMARY

A summary of sample aspects of the disclosure follows. It should be understood that any reference to the term aspects herein may refer to one or more aspects of the disclosure.

The disclosure relates in some aspects to two-way ranging that employs relatively short turnaround times. By providing short turnaround times, accurate ranging measurements may be made even with the relative clock drift between ranging nodes (e.g., devices) is relatively high (e.g., on the order of 1 to 10 ppm). Consequently, the techniques described herein may be employed in, for example, low power and/or non-coherent wireless devices.

The disclosure relates in some aspects to the use of symmetric channels to facilitate concurrent transmission of ranging messages between nodes. Here, symmetric channels are established by configuring the nodes to provide inter-pulse transmission and reception. For example, each node may be configured to receive one or more pulses associated with a received ranging message between pulse transmissions associated with a transmitted ranging message. The symmetric channels also may be used to provide low delay, two-way communications between the nodes.

In some aspects the pulses may comprise ultra-wideband ("UWB") pulses. For example, the pulses may have a pulse width on the order of four nanoseconds or less. In addition, these pulses may be transmitted using a relatively low duty cycle (e.g., such a pulse may be transmitted on the order of every 200 nanoseconds).

Through the use of symmetric channels, one node may commence transmission of a reply ranging message (e.g., comprising one or more pulses that are timestamped) shortly after another node transmits a ranging message (e.g., comprising one or more pulses that are timestamped). In some cases, the reply time (turnaround time) may be as short as a pulse interval.

The disclosure relates in some aspects to setting up symmetric channels based on an approximate relative drift estimate that is provided by a low-complexity time-tracking algorithm. For example, a low-power device may utilize such a low-complexity time-tracking algorithm to reduce the relative clock drift between the devices to a sufficient degree to enable communication between the devices and accurate ranging measurements.

In view of the above, the disclosure relates in some aspects to a technique for implementing two-way ranging efficiently and accurately in ultra-low power (e.g., non-coherent) UWB radios. In addition, the disclosure relates in some aspects to utilization of a symmetric channel for improving accuracy of two-way ranging in impulse radio.

BRIEF DESCRIPTION OF THE DRAWINGS

These and other sample aspects of the disclosure will be described in the detailed description and the appended claims that follow, and in the accompanying drawings, wherein:

FIG. 4 is a simplified diagram illustrating sample two-way ranging messaging on symmetric channels;

FIG. 7A is a simplified diagram illustrating sample detection of a leading edge of a pulse;

FIG. 7B is a simplified diagram illustrating sample offsets between leading edges of pulses and normal receive windows;

Figure 1:
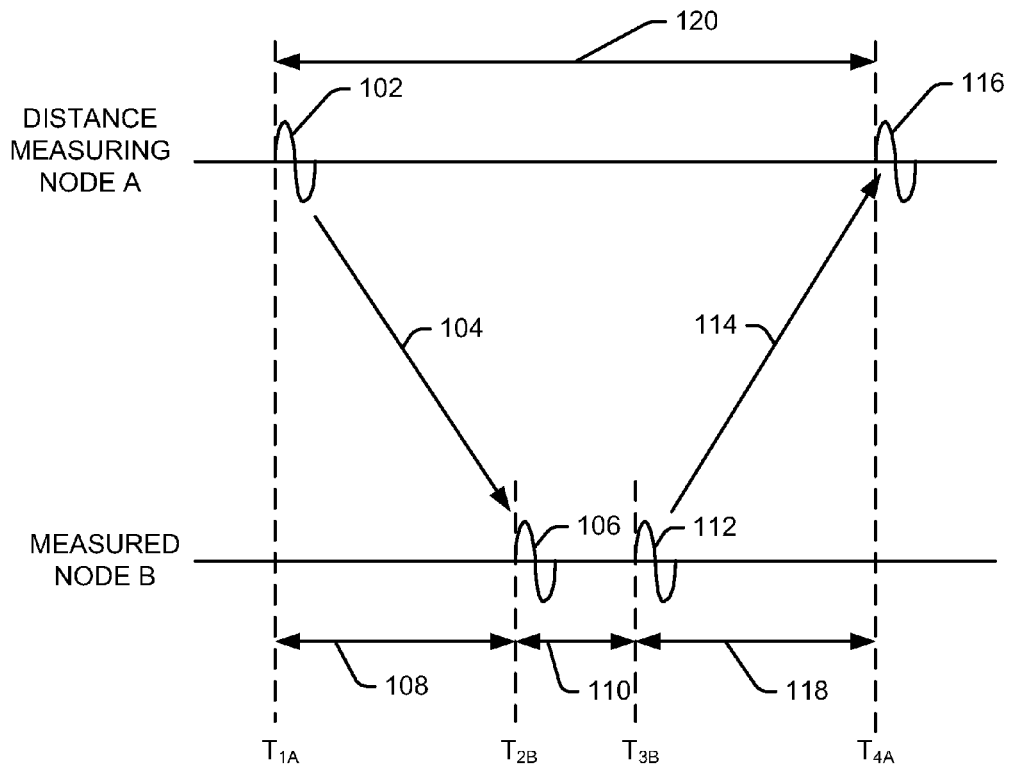
FIG. 1 is a simplified diagram illustrating sample two-way ranging signal timing.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises: transmitting, by a first node, a first set of pulses; receiving, at the first node, a second set of pulses, wherein at least one pulse of the second set is received after at least one pulse of the first set is transmitted and before at least one other pulse of the first set is transmitted; and determining a distance between the first and second nodes based on at least some of the pulses of the first set and at least some of the pulses of the second set. In addition, in some aspects the first node transmits a timestamp via the first set of pulses while receiving a timestamp via the second set of pulses.

The disclosure relates in some aspects to providing an accurate ranging measurement when there is relatively significant clock drift between nodes that are involved in the ranging measurement. In some aspects, this involves the use of a symmetric channel that enables one node to commence transmission of a reply ranging message (e.g., a ranging preamble comprising a pulse that is timestamped) shortly after another node transmits a ranging message (e.g., a ranging preamble comprising another pulse that is timestamped).

For illustration purposes, various aspects of the disclosure will be described in the context of an impulse-based communication system where nodes in the system are configured to transmit and receive pulses. In some aspects, such a communication system may comprise a UWB system where the nodes transmit and receive UWB pulses. It should be appreciated, however, that the teachings herein may be applicable to other types of communication systems, frequency bands, and devices.

In an UWB system, pulses with widths on the order of a nanosecond or less may be used for communication. The use of such narrow pulses also enables efficient implementation of accurate ranging operations. As will be discussed in more detail in conjunction with FIG. 7A below, a goal of a ranging operation may be to accurately identify the line-of sight (LOS) path (e.g., the leading edge) of a received pulse and to estimate the time-difference (e.g., the propagation delay) between when the pulse was transmitted by one node and when the pulse was received by another node.

In some wireless systems (e.g., a system employing portable UWB devices), it is desirable to utilize low power and/or low cost devices. Such constraints may, however, limit the capabilities of the components that may be used in these devices. For example, a low cost clock used in an ultra-low power radio may have a drift on the order of ±100 ppm. Consequently, it may not be feasible in an ultra-low power design to provide very low drift (e.g., clock drift of less than 1 ppm) that may be provided in higher-power coherent radios that use extremely accurate drift estimation algorithms (which may be relatively complex and/or involve relatively high power consumption).

Figure 3A:
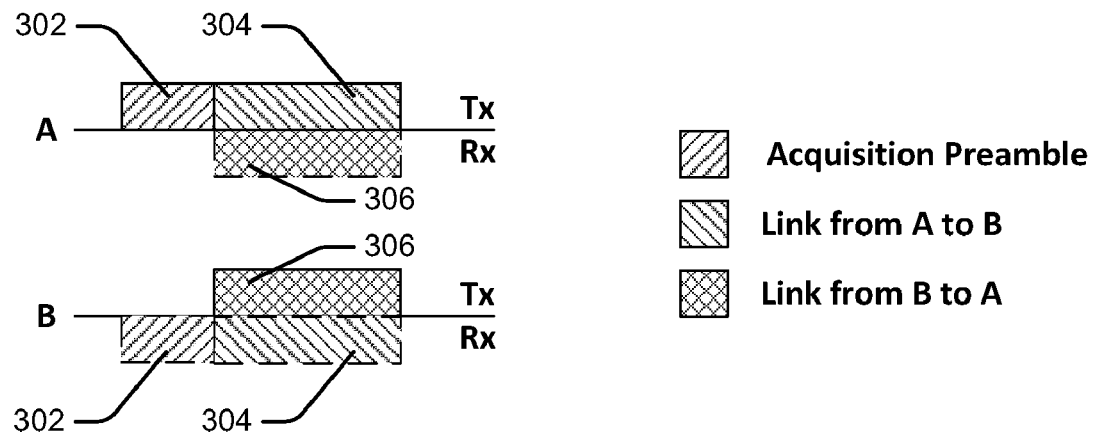
FIGS. 3A and 3B are simplified diagrams illustrating sample symmetric channels.
Figure 3B:
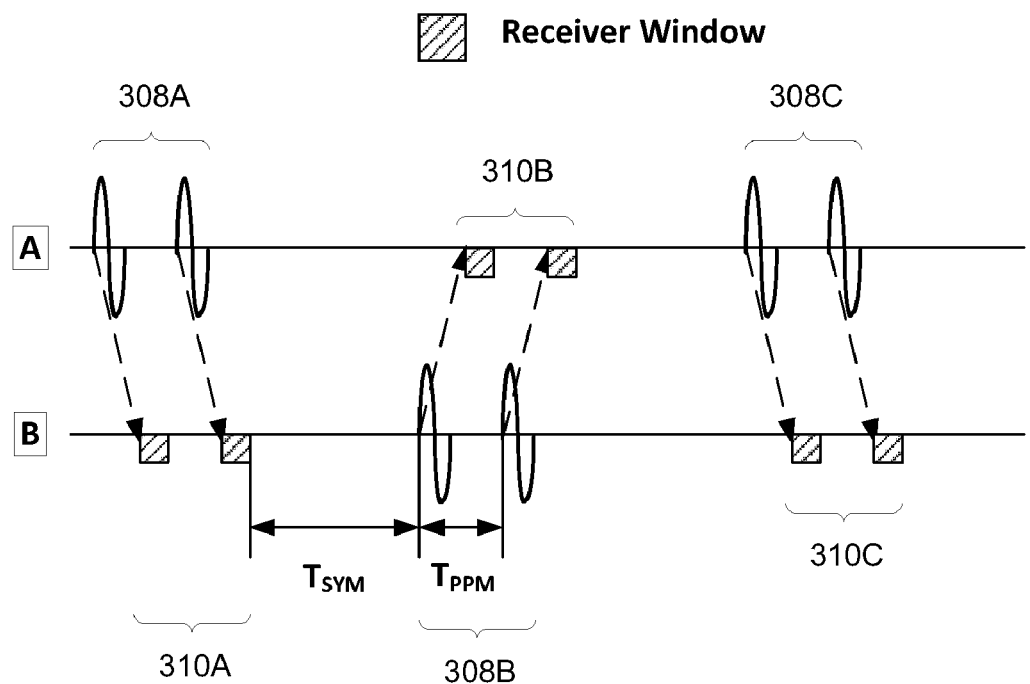

In accordance with the teachings herein, a channel structure (referred to as a symmetric channel herein) may be used to minimize the error due to the residual drift associated with a low-complexity time-tracking algorithm. FIGS. 3A and 3B illustrate simplified examples of symmetric channels that may be employed in an impulse-based system.

FIG. 3A illustrates a sample symmetric channel from a macro level (e.g., packet level) perspective. Here, node A transmits an acquisition preamble 302 that is received (after a propagation delay) at node B. Symmetric communication links are thereby established between the nodes such that packet data 304 is sent from node A to node B concurrently with packet data 306 being sent from node B to node A.

FIG. 3B illustrates sample inter-pulse transmission and reception (e.g., pulse-level alternation) that may be used to achieve multiplexing on a two-way link between node A and node B. In this example, pulses are transmitted using binary pulse position modulation ("BPPM"). Thus, for each symbol to be sent from one node to another node, a pulse is transmitted in one of the indicated pulse position pairs 308 (308A, 308B, etc.) where the pulse positions are separated by a defined period of time $T_{PPM}$. At each receiving node, a pair of receiver windows 310 (310A, 310B, etc.) is defined for searching for a pulse in either of the two positions. It should be appreciated that the teachings herein also may be employed in conjunction with other modulation schemes.

To facilitate concurrent packet transmission and reception, the timing of the transmit and receive pulses (e.g., as negotiated by the nodes A and B) may be such that a given node may transmit a first set of pulses while receiving a second set of pulses. For example, a node may transmit one or more pulses of the first set, then receive one or more pulses of the second set, then transmit one or more other pulses of the first set, and so on. As a specific example, node A may transmit a pulse at one of the pulse positions 308A, then node A may receive a pulse at one of the receiver windows 310B, then node A may transmit a pulse at one of the pulse positions 308C, and so on. Thus, a node may transmit a pulse (e.g., a timestamp pulse) within a symmetric communication turnaround time (represented by $T_{SYM}$) after receipt of a pulse (e.g., a timestamp pulse). In one example, the timing between transmitted pulses (e.g., the delay between pulse positions 308A and 308C) may be on the order of 500 nanoseconds and $T_{SYM}$ may be on the order of 100 nanoseconds. This example does not consider time-hopping. If time hopping is employed, $T_{SYM}$ and the timing between transmitted pulses may vary. In this case, these parameters may be defined with respect to, for example, the first time-hopping slot for each symbol.

Figure 2:
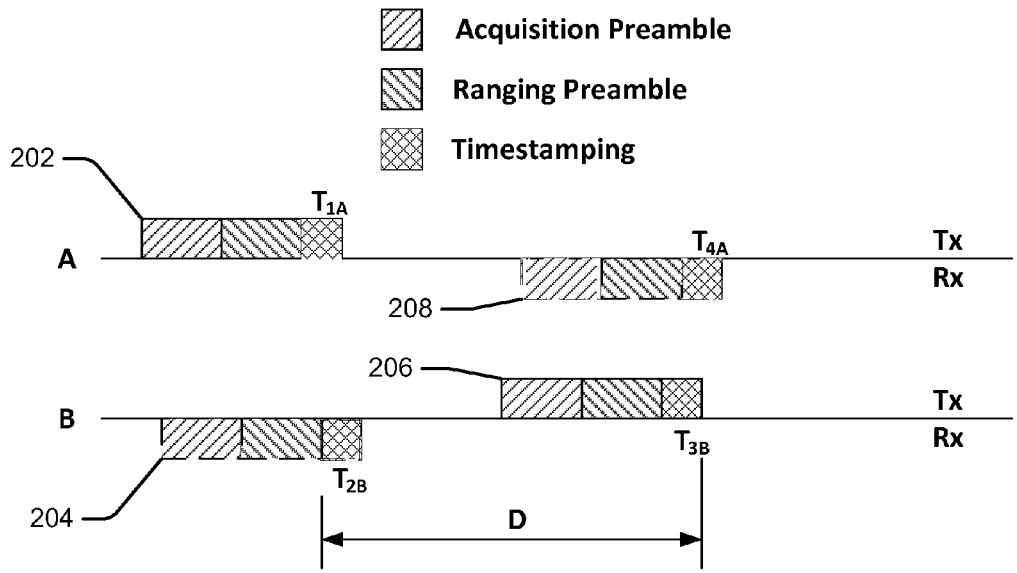
FIG. 2 is a simplified diagram illustrating sample two-way ranging messaging.

Thus, by conducting timestamping operations for two-way ranging over a symmetric channel, the effective reply time D discussed above may be significantly smaller than in the two-way packet exchange scheme of FIG. 2. In FIG. 2, D may be on the order of packet lengths. In the symmetric channel, D may be on the order of (e.g., approximately equal to) a symbol duration time (e.g., 100 ns) or more. Consequently, the drift estimation requirement may be relaxed significantly thereby enabling accurate two-way ranging in ultra-low power coherent UWB radios or other types of ranging devices.

Depending on the implementation parameters, there may be another benefit to providing two-way ranging on a symmetric channel. To compute the propagation delay in the packet exchange algorithm of FIG. 2, either node B sends a function of the timestamp values at node B ($T_{3B}-T_{2B}$) to node A or node A learns the value of D with much better accuracy than the required accuracy in the estimate of propagation delay. However, the second option may be difficult to realize in a general ad-hoc network.

In contrast, when a symmetric channel is used, the reply time D may be directly related to $T_{SYM}$ and hence, the second option may be more feasible. In this case, node A need not wait for any additional information (e.g., indicative of the current $T_{3B}-T_{2B}$) to complete the ranging computation.

A sample ranging design utilizing symmetric channels is shown in FIG. 4. The process may start with node A sending a standard acquisition preamble 402 (e.g., the same preamble that is used in conjunction with sending data packets) to node B. Then, node A may send a drift estimation preamble 404 that node B may use to obtain an initial estimate of the drift (e.g., using a low complexity technique as described below in conjunction with FIGS. 7A-8). The residual drift may still be significant (e.g., on the order of 10 ppm) at the end of this drift estimation preamble. At point (a), node B may either provide the rough drift estimate to node A or node B may transmit using a drift-adjusted clock (e.g., adjusted according to the drift estimate). Thus, in the example of FIG. 4, an acquisition preamble 406 transmitted by node B may be sent based on an adjusted clock. At point (b), both nodes have enough information to start a symmetric channel (e.g., each node has determined the size and timing of its receiver windows for receiving pulses from the other node, while accounting for the drift based on the rough drift estimate, if applicable). Node A then commences transmission of a ranging preamble 408 and node B commences transmission of a ranging preamble 410. As discussed herein, the transmission of pulses by nodes A and B may be interleaved, may be partially interleaved, or may not be interleaved. As one example, after drift estimation, one node (e.g., node A) may first send a defined number (e.g., 64) of pulses of its ranging preamble then the other node (e.g., node B) may send 64 pulses of its ranging preamble in conjunction with leading edge estimation. If the preambles are longer than the defined number of pulses, subsequent pulses transmitted by the two nodes may be interleaved. Conversely, if the preambles are equal to the defined number of pulses, there may not be interleaved pulses here. In some aspects, the above preambles may comprise pseudorandom sequences. Thus, each node that receives a preamble from another node may synchronize to that preamble based on the detected sequence. During the transmission of the ranging preambles, the nodes may perform hypothesis testing on received ranging preambles to obtain the LOS path position estimate. The timestamping operation is complete by point (c). In some cases, the timestamping may be done at a predefined symbol index. Through the use of such an index (or some other parameter definition), if desired, the reply time D may be defined to be as small as a two-way symbol duration time. In some cases, node B sends the timestamps (or equivalently the reply time $T_3B-T_2B$) to node A. Node A may then use that information, in addition to its timestamps, to compute the round-trip time.

With the above in mind, sample ranging operations will be described in more detail in conjunction with the flowchart of FIG. 5. The operations of FIG. 5 (or any other operations discussed or taught herein) may be performed by one or more of the components described herein (e.g., components of a system 600 shown in FIG. 6). It should be appreciated, however, that these operations may be performed by other types of components and may be performed using a different number of components. It also should be appreciated that one or more of the operations described herein may not be employed in a given implementation.

Figure 6:
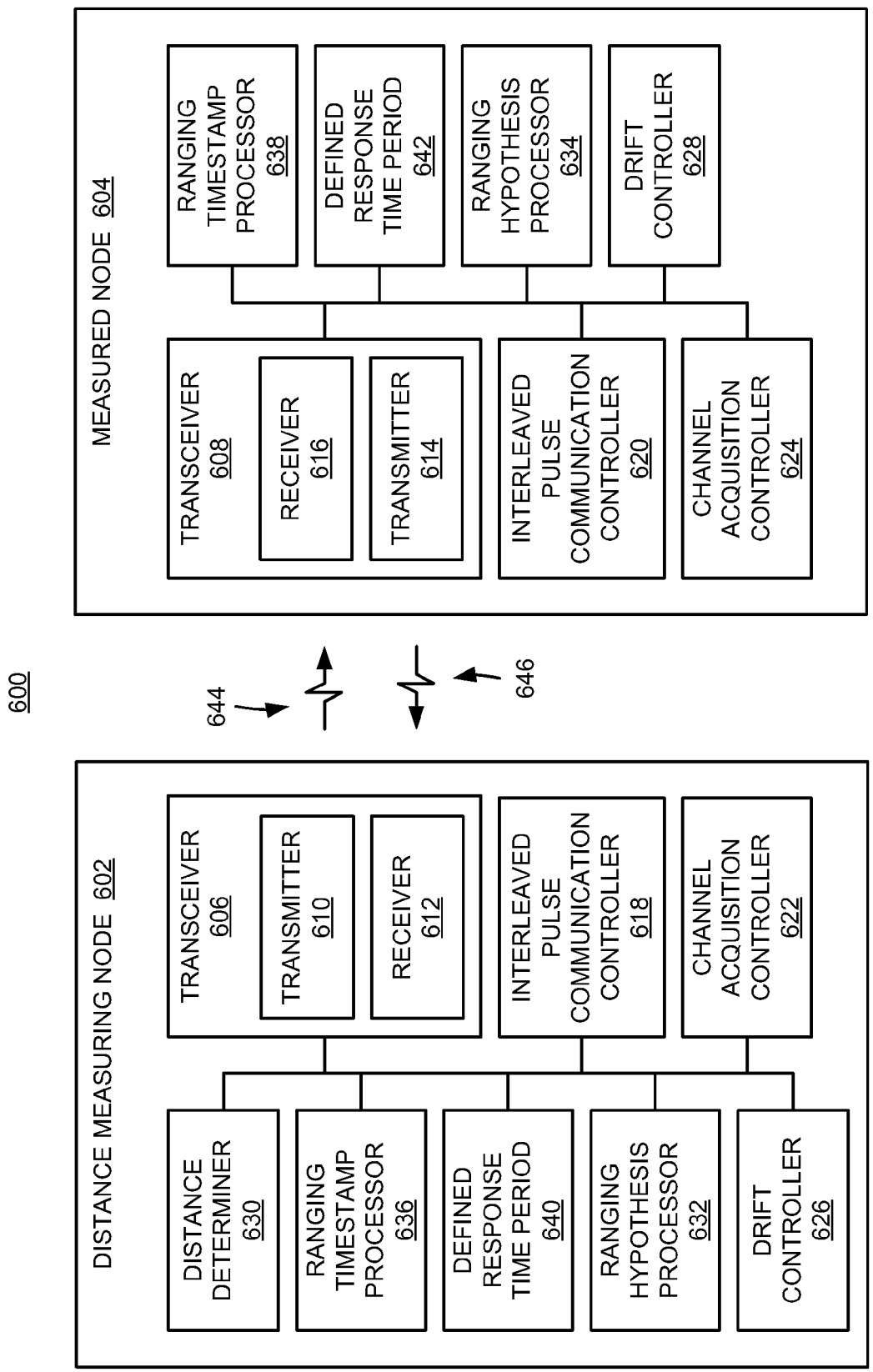
FIG. 6 is a simplified block diagram of several sample aspects of a communication system including nodes configured to support two-way ranging.

FIG. 6 illustrates sample aspects of a system 600 where a distance measuring node 602 (e.g., node A) measures the distance to a node 604 (e.g., node B). The nodes 602 and 604 include transceivers 606 and 608, respectively, for sending data to and receiving data from each other (and/or one or more other nodes in the system 600, not shown). The transceivers 606 and 608 include respective transmitters 610 and 614 for transmitting pulse signals and respective receivers 612 and 616 for receiving pulses. Here, it should be appreciated that a given transceiver (e.g., transceiver 606) may support at least one transmission stream while receiving at least one stream. For example, a node may send a packet via a series of pulses while concurrently receiving a packet via a series of pulses as discussed herein (e.g., a given transceiver may be configured to receive one or more pulses between pulse transmissions, and vice versa).

Each node 602 and 604 includes components that provide functionality relating to ranging operations. For example, interleaved pulse communication controllers 618 and 620 may establish a symmetric channel (e.g., by negotiating to define the times at which the transmitters 610 and 614 transmit pulses and when the receivers 612 and 616 monitor for pulses). As discussed herein, these times may be defined such that ranging messages are concurrently transmitted by the transmitters 610 and 614. Channel acquisition controllers 622 and 624 may perform channel acquisition operations (e.g., generating an acquisition preamble to be transmitted and analyzing a received acquisition preamble). Drift controllers 626 and 628 may individually or cooperatively determine drift (e.g., generating a drift estimation preamble to be transmitted and estimating drift by analyzing a received drift estimation preamble) and compensate for the drift (e.g., adjust clock timing).

A distance determiner 630 may perform operations to determine the distance between the nodes and 602 and 604 by causing appropriate signals 644 (e.g., messages) to be sent to the node 604 and analyzing signals 646 (e.g., messages) received from the node 604. The distance determiner 630 may operate in conjunction with a ranging timestamp processor 636 that performs timestamp related processing (e.g., generating timestamps for transmitted pulses and/or analyzing received pulses to determine timestamps) for the node 602. A ranging timestamp processor 638 may perform complementary operations at the node 604. Ranging hypothesis processors 632 and 634 may perform ranging hypothesis operations such as, for example, causing preambles to be sent at specified times and analyzing received signals to identify ranging signals. These operations may be performed, for example, to facilitate detection of a leading edge of a received timestamp. Defined response time period information 640 and 642 (e.g., the time period D) may be maintained at the nodes 602 and 604, respectively. It should be appreciated that the functionality of any of the components of a given node as described herein may be implemented in one or more components (e.g., one or more of these components may be implemented within a single controller).

Figure 5:
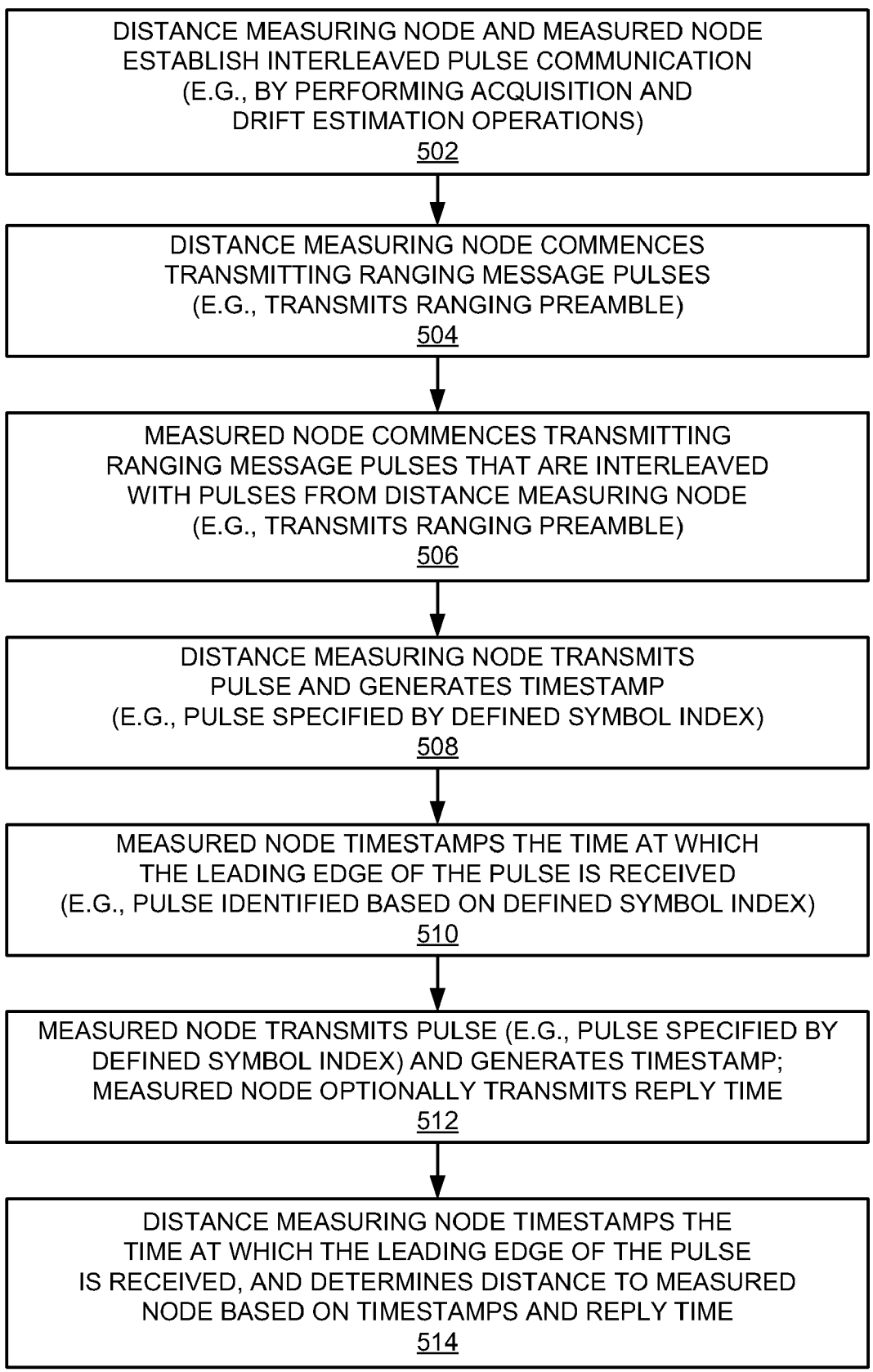
FIG. 5 is a flowchart of several sample aspects of operations that may be performed to provide two-way ranging on symmetric channels.

Referring to FIG. 5, as represented by block 502, at some point in time the distance measuring node 602 and the measured node 604 may establish symmetric channels. For example, the nodes 602 and 604 may initially communicate over a known channel to determine (e.g., define or receive information relating to) transmit times for each node, time hopping sequences, timing offsets, or any other suitable channel parameter for one or more communication and/or ranging channels to be used by the nodes 602 and 604. In addition, the nodes 602 and 604 may perform acquisition operations using acquisition preambles and drift estimation operations using drift estimation preambles (e.g., to determine receiver windows as discussed above). In some aspects, the nodes 602 and 604 may establish communication with a rough estimate of the relative drift. Sample drift estimation operations will be described in more detail in conjunction with FIGS. 8A-9. Also at block 502, one or both of the nodes 602 and 604 may indicate (e.g., by sending a message) that a ranging operation is to take place. Interleaved pulse communication for ranging may be established either before or after the nodes 602 and 604 decide to do ranging. For example, in some cases the nodes 602 and 604 may establish symmetric channels (e.g., for data communication) and later elect to do ranging. Alternatively, the nodes 602 and 604 may elect to do ranging (e.g., by communicating over another channel or channels) and then set up the symmetric channels.

As represented by block 504, the node 602 commences transmitting ranging signals (e.g., a ranging preamble). In some cases, the node 602 may commence sending the ranging preamble sequence based on when the node 602 sent its acquisition preamble and/or drift estimation preamble (e.g., a defined time after the drift estimation preamble is sent). In some cases, the node 602 may determine when to commence sending its ranging preamble (e.g., the leading edge of the ranging preamble) based on when it receives the acquisition preamble (e.g., the leading edge of the acquisition preamble) from the node 604. For example, a symbol index may define (e.g., may be used to specify) a delay period to be used here.

As represented by block 506, the node 604 commences transmitting ranging signals (e.g., a ranging preamble). As above, the node 604 may commence sending its ranging preamble sequence based on when the node 604 sent or received some other preamble. As shown in FIG. 4, the ranging operations of nodes 602 and 604 may occur concurrently through the use of symmetric channels (e.g., the transmissions of at least some of the pulses by the nodes are interleaved in time) whereby a given node will transmit one or more pulses of a packet, then receive one or more pulses, then transmit one or more pulses of the packet, and so on. The timing of these operations may be specified, for example, by the symbol index.

The nodes 602 and 604 may perform their respective ranging hypothesis operations as each node receives a ranging preamble from the other node (and as each node sends its own ranging preamble). Thus, in some aspects these hypothesis operations may be performed concurrently through the use of symmetric channels. Here, the ranging hypothesis operations may involve, for example, analyzing different samples of the received pulses to facilitate locating the leading edge of a timestamp (e.g., one or more pulses) at the end of the ranging preamble. For example, signal levels (e.g., a summation of the detected energy) associated with different hypotheses may be analyzed (e.g., compared to a threshold) to estimate where a leading edge of a timestamp occurs (e.g., to define a narrower receiver search window for locating the leading edge).

FIG. 7A illustrates how leading edge detection may differ from conventional signal detection (e.g., which may be used for data communication operations). Here, node A sends a pulse 702 that is transmitted (as represented by arrow 704) to node B. The pulse 706 represents the received pulse at node B. In conventional signal detection, the typical acquisition point will correspond to the strongest signal path. Thus, for data communication purposes, the pulse 706 may be acquired at or near point 708. In contrast, for ranging purposes, the acquisition search may attempt to locate the leading edge 710 of the pulse 706.

FIG. 7B illustrates how a ranging acquisition search may utilize a wider search window than a conventional search (e.g., in a non-coherent receiver). The pulse 712 represents a received pulse at node B and the pulse 720 represents a received pulse at node A. In conventional signal detection, a search window 714 may be defined to acquire a pulse at node B and a search window 722 may be defined to acquire a pulse at node A. As indicated by time period 718, however, the search window 714 is not wide enough to acquire the leading edge of the pulse 712. Hence, the ranging hypothesis testing may search before and after the normal search windows 714 and 722 (e.g., the search window may be twice as wide) and may search with higher resolution (e.g., on the order of 1 ns) to detect leading edges.

FIG. 7B and other figures herein illustrate that a node may send a pulse then receive a pulse. It also should be appreciated that the nodes may send multiple pulses before receiving one or more pulses. For example, the node 602 may transmit several ranging preamble pulses, then the node 604 may transmit several ranging preamble pulses.

As represented by block 508 of FIG. 5, the node 602 transmits a pulse and generates a corresponding timestamp. In some cases the pulse to be timestamped is defined by a symbol index. For example, the symbol index may specify that the $64^{th}$ pulse in node 602's ranging preamble is to be timestamped. In some aspects, the pulse (e.g., the leading edge of the pulse) may be transmitted a defined period of time after the occurrence of a specified event. For example, the pulse may be transmitted a defined number of pulses after a given event occurs (e.g., transmission of the leading edge of the acquisition preamble or the ranging preamble by the node 602).

As represented by block 510, the node 604 then generates a timestamp to record the time at which the leading edge of the pulse sent at block 508 is received at the node 604. In some cases, the node 604 may identify the received pulse to be timestamped based on a symbol index. Continuing with the above example, the node 604 may identify the $64^{th}$ pulse of the ranging preamble that the node 604 receives from the node 602, then identify the leading edge of that pulse and generate a timestamp corresponding to the time of arrival of that leading edge.

As represented by block 512, the node 604 then transmits a pulse and generates a corresponding timestamp. In some cases the pulse to be timestamped by the node 604 also is defined by a symbol index. For example, the symbol index may specify that the $70^{th}$ pulse in node 604's ranging preamble is to be timestamped. In some aspects, the pulse (e.g., the leading edge of the pulse) may be transmitted a defined period of time after the occurrence of a specified event. For example, the pulse may be transmitted a defined number of pulses after a given event occurs (e.g., transmission of the leading edge of the acquisition preamble or the ranging preamble by the node 604). In some aspects, the time of transmission of the pulse may correspond to a defined delay period after the node 602 transmits its timestamp or after the node 604 receives the timestamp (e.g., the leading edge of the timestamp) transmitted by the node 602. This timing may, for example, be predefined, be specified by a symbol index, or be specified in some other manner.

In some implementations the node 604 also may send an indication of the reply time to the node 602 (e.g., in cases where the reply time is a dynamic value as a result of the nodes 602 and 604 independently determining when to commence their respective ranging preambles). In some cases, the node 604 may send the timestamps recorded at blocks 510 and 512 to the node 602 or may send the time difference between these two timestamps (e.g., $T_{3B}-T_{2B}$). In some case, the node 604 may send an offset value to the node 602. For example, as shown in FIG. 7B, a delay period 716 may be defined by protocol between the beginning of the search window and the time of transmission of the pulse at $T_{3B}$. In such a case, the node 604 may send an indication of the offset 718 to the node 602.

As shown in FIG. 4, the nodes 602 and 604 may concurrently perform timestamp-related operations. For example, the nodes may concurrently perform ranging hypothesis operations. In addition, each node may identify one or more pulses to be timestamped and perform operations to transmit such a pulse while concurrently processing received pulses, identifying a pulse that is to be timestamped, and timestamping the pulse.

As represented by block 514 of FIG. 5, the node 602 generates a timestamp to record the time at which the leading edge of the pulse sent at block 512 is received at the node 602. In some cases, the node 602 may identify the received pulse to be timestamped based on a symbol index. Continuing with the above example, the node 602 may identify the $70^{th}$ pulse of the ranging preamble that the node 602 receives from the node 604, then identify the leading edge of that pulse and generate a timestamp corresponding to the time of arrival of that leading edge.

The node 602 (e.g., the distance determiner 630) then determines the distance to the node 604 based on at least some of the pulses it transmitted and received. In some cases, the node 602 subtracts the reply time received from the node 604 from a period of time that is defined based on the time at which the node 602 transmits its timestamped pulse (e.g., the leading edge of the timestamped pulse) and the time that the node 602 received the timestamped pulse (e.g., the leading edge of the timestamped pulse) from the node 604. In a case where the node 604 sends an indication of the offset 718 (FIG. 7B), the node 602 may determine its corresponding time offset 724, and use this offset information to determine the reply time.

As mentioned above, in other cases the reply time may be specified to be a particular (e.g., predefined) value. For example, upon receiving the pulse at block 510, the node 604 may adjust its preamble sequence so that the appropriate pulse in the preamble sequence (e.g., the $64^{th}$ pulse) is sent a defined period of time after the node 604 receives the leading edge of the pulse from the node 602. In some aspects, the node 604 may retroactively determine the time at which it received the leading edge of the ranging preamble from the node 602. For example, the node 604 may determine the precise timing of that leading edge some time after the node 604 commences transmission of its ranging preamble (e.g., after the node 604 processes several pulses of the ranging preamble it receives from the node 602). Then, based on the time at which the node 604 actually did receive the leading edge of the preamble from the node 602, the node 604 may determine when to send its timestamped pulse (e.g., a defined period of time after receiving the leading edge of the timestamped pulse from the node 602).

In cases where the node 604 adjusts its preamble sequence, the node 602 may be configured to account for this change. For example, the node 602 may utilize a wider search window or may wait a longer period of time before doing timestamping (e.g., in a case where the node 604 may slowly adjust its ranging preamble timing).

In implementations where the reply time is specified, the node 602 (e.g., the distance determiner 630) determines the distance to the node 604 based on node 602's timestamps and the fixed reply time. For example, the node 402 may determine the round-trip time by subtracting the defined reply time from $T_{4A}-T_{1A}$.

As mentioned above, a relatively low complexity time tracking algorithm may be employed to reduce the drift error in a system as described herein. A sample $2^{nd}$-order early-late gate based low complexity time-tracking algorithm that may be used to reduce this drift error (e.g., by providing an estimate of the drift error) will now be described in conjunction with FIGS. 8A-9. Depending on the system parameters, this algorithm may deliver accuracies of a few ppm (e.g., on the order of 10 ppm).

Since UWB systems use very narrow pulses to communicate, the receiver time tracking algorithm may be critical. The tolerable error in pulse tracking may be in the order of nanoseconds for energy detection receivers and picoseconds for coherent receivers. The following describes the use of early-late time tracking algorithm that may be used, for example, in low power UWB energy detection receivers. The following describes, in some aspects: a method to enable accurate time tracking for non-coherent low power UWB radios; a method to enable coarse and fine tracking by appropriately changing the loop parameters during reception; a method to estimate the clock drift between two devices forming a communication link; use in ranging and communication; sample decision block processing methods; sample decision block processing methods for PPM modulated UWB; and a method to reduce the impact of local maxima by occasionally looking at "earlier" and "later" windows.

Consider a non-coherent (e.g., energy detector) UWB receiver. A goal of the time tracking loop may be to keep the energy detection integration window as close as possible to an optimal location. The type of errors that a time tracking algorithm should cancel may include: initial offset errors (carry over from acquisition); timing drift between transmitter and receiver due to clock drifts; and jitter in timing circuits and clocks.

Figure 8A:
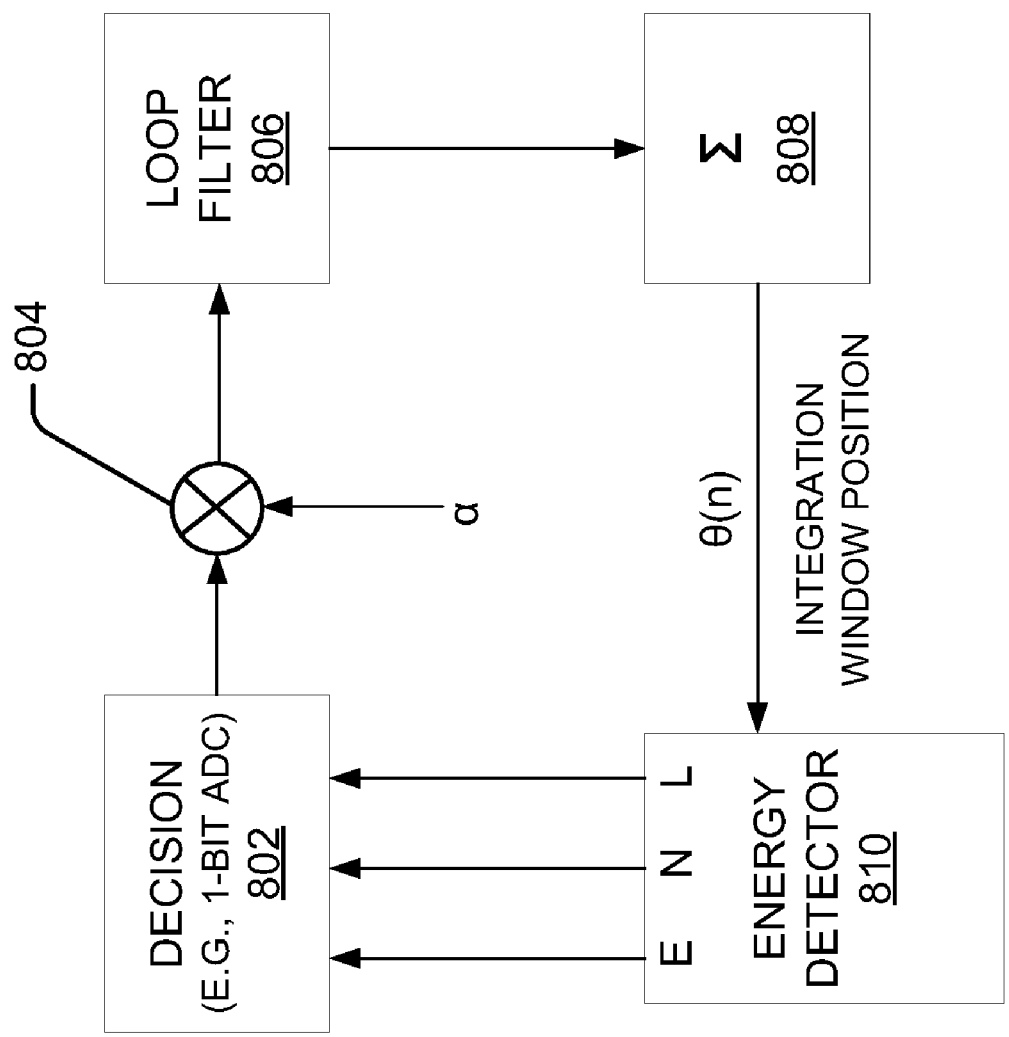
FIGS. 8A and 8B are simplified diagrams illustrating a sample early-late gate scheme.
Figure 8B:
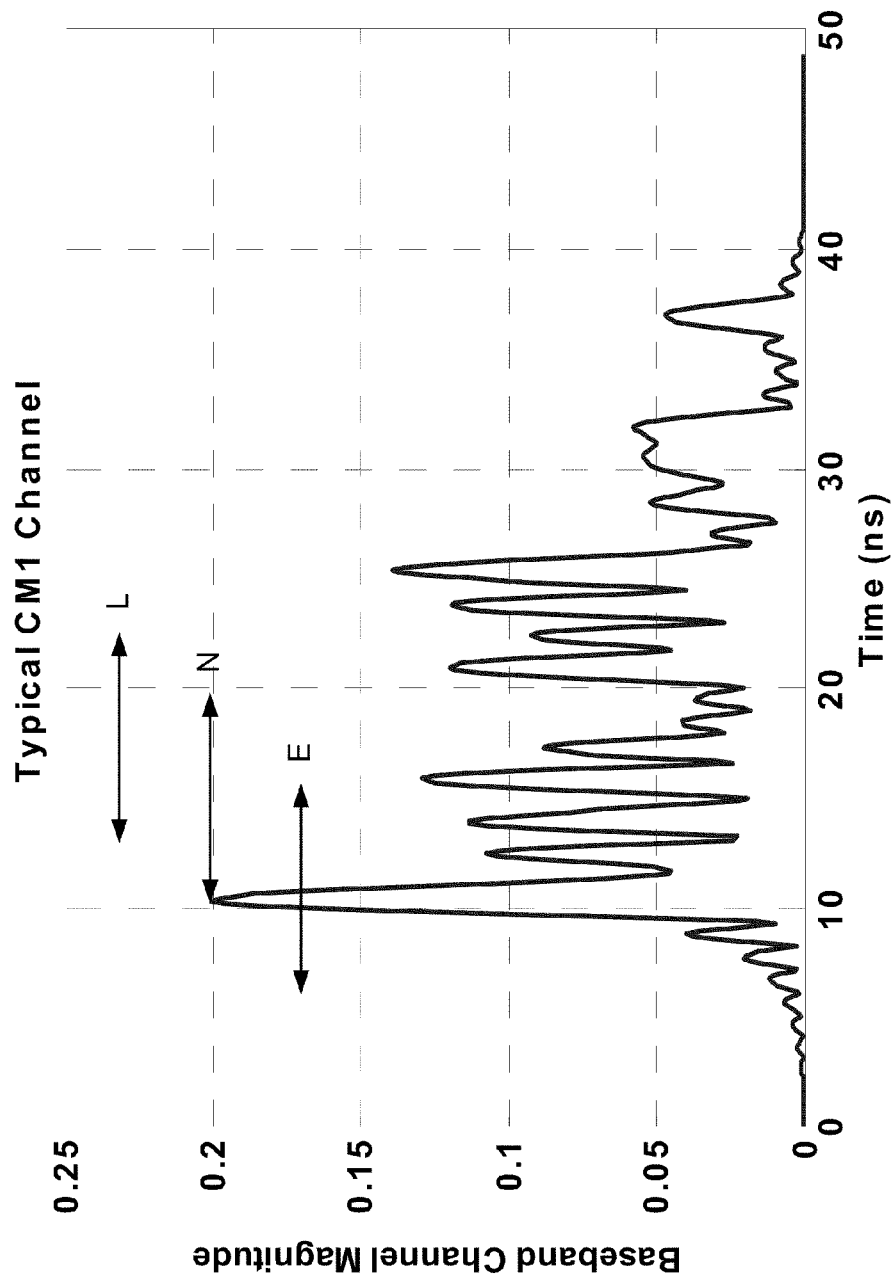

FIG. 8A shows a sample structure for implementing an early-late time tracking algorithm. FIG. 8B shows sample UWB channel signals to illustrate sample positions of early, normal, and late (E, N and L) windows (e.g., whereby energy is detected during each window). Here, a nominal window (N) is used for data detection. A decision block 802 processes early, normal, and late inputs (E, N and L) and provides an output to a multiplier 804. The multiplier 804 multiplies this output with a parameter α and provides the result to a loop filter F(z) 806. The output of the loop filter 806 is provided to a summer 808 to provide a signal θ(n) that controls the position of the nominal window (N) used by an energy detector 810. The decision block 802 and the loop filter 806 may be designed such that the nominal window stays close to an optimal position. In some aspects, the specific design of the decision block 802, the loop filter 806, the length of the energy detection window, and spacing between the early, nominal and late windows depends on the nature of errors that the time tracking loop has to cancel.

In some systems the early and late energy values E and L may not be updated every pulse. For example, they may only be updated every alternate pulse.

Examples of processing operations that may be performed by the decision block 802 include: E−L, the difference between the energies in early and late gate; N-bit quantization of E−L; sign(E−L); sign(E−L) with an erasure region and outlier region; and E−N and N−L for alternate pulses. Selection of a specific operation for the decision block 802 may depend on the nature of the implementation and tracking errors.

Figure 9:
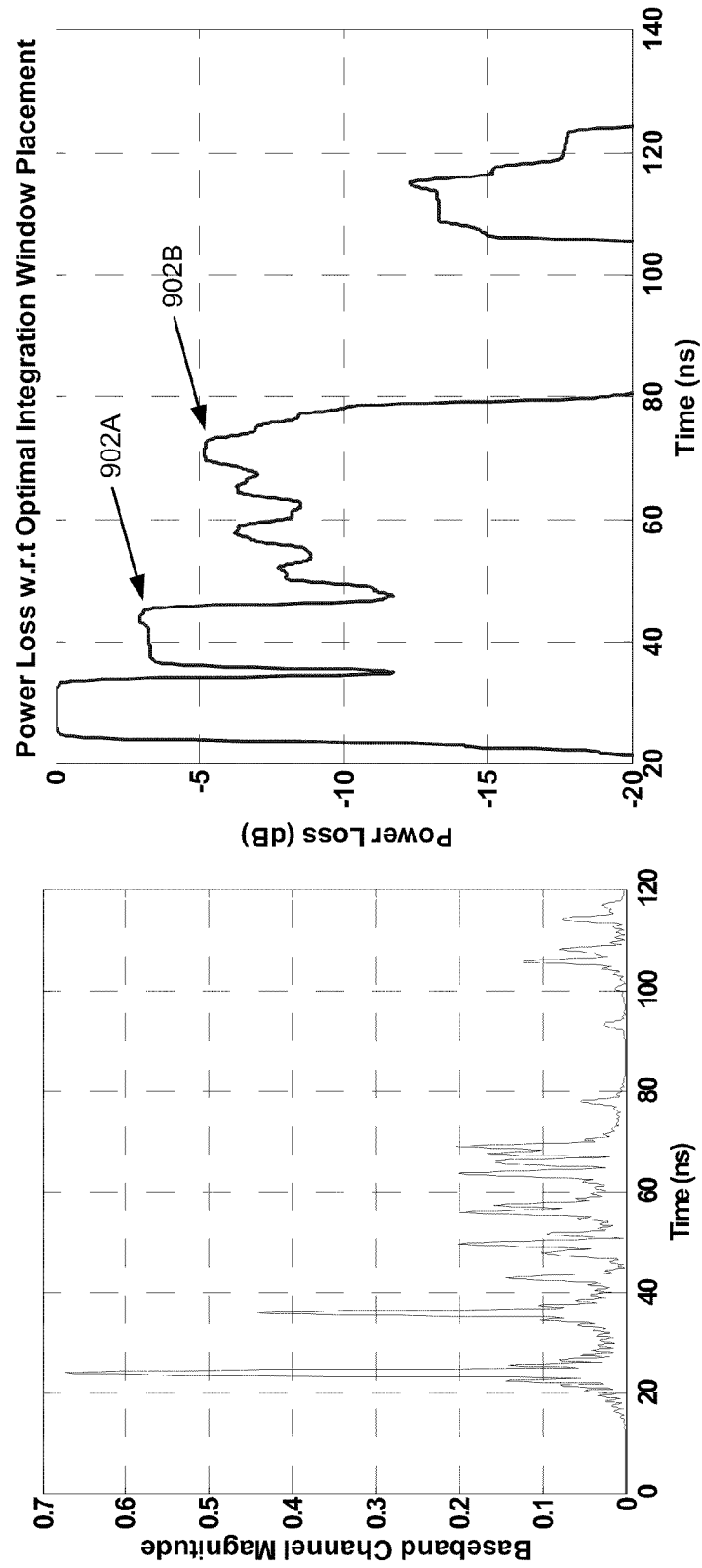
FIG. 9 is a simplified diagram illustrating sample local maxima.

One problem that may be encountered by an early-late gate loop in a UWB channel is local maxima. As shown in FIG. 9, there may be multiple points in the channel where there is no drift in either direction. The parameters of the loop may be designed such that it does not get stuck in these sub-optimal points.

In addition, the time-tracking loop may look at positions other than just the current E, N and L windows. The loop may look at "earlier" and "later" windows occasionally to check and see if it is stuck in local maxima (e.g., local maxima 902A or 902B). The specific parameters (e.g., how often, how "earlier" or "later") may depend on the nature of the implementation, nature of the tracking errors and channel parameters (e.g., delay spread).

Sample loop filter options will now be described. Typically, a first or second order loop may be used.

In one example, F(z) is set equal to 1 for a first order loop. In combination with the accumulator 808, this may modify the current position of nominal window θ(n) according to Equation 2 where φ(n) is the output of the decision block 802. A first order filter may be sufficient for canceling a constant initial error in position.

$$\theta(n+1)=\theta(n)+\alpha\phi(n) \quad \text{EQUATION 2}$$

A second order loop may modify the current sampling phase θ(n) according to Equations 3 and 4. This filter also may cancel a timing drift component.

$$\Delta(n)=\Delta(n-1)+\beta\phi(n) \quad \text{EQUATION 3}$$

$$\theta(n+1)=\theta(n)+\alpha\phi(n)+\Delta(n) \quad \text{EQUATION 4}$$

In a non-coherent low power system, the time tracking loop may be used for coarse tracking at the start of the packet and for fine tracking afterwards. Initially, the time tracking loop may have to deal with a large offset due to acquisition resolution. This scenario may require aggressive loop parameters to quickly reach a good operating point. However, an aggressive loop also may lead to significant oscillations in window position. Hence, a less aggressive tracking loop may be useful after the initial tuning of integration window.

These two goals may be achieved by changing the second order parameter β. Initially, a large value of β may be used to obtain a loop with fast response. The parameter may then be reduced to get a fine tracking loop. For example, one possible method of variation of loop parameter may be $\beta(n)=\beta(0)\gamma^n$ where γ is an appropriately chosen parameter. Another way may utilize a finite set of values with different elements of the set being used at different stages of packet reception.

The parameter Δ(n) in Equation 3 is an estimate of the relative clock drift of the two devices. The accuracy of this estimate depends in some aspects on the specific system and on the loop parameters α and β. If the parameters are aggressive, the variation in Δ(n) may be quite high and lead to an unreliable estimate. However, a less aggressive set of loop parameters may give excellent estimates of relative drift.

As mentioned above, the estimate of relative drift may be used in conjunction with ranging algorithms such as two-way ranging. For example, a given node (e.g., node B) may adjust its timing based on the drift estimate or send an indication of the drift estimate to an associated node (e.g., node A). In this way, the relative drift may be brought within an acceptable level for ranging operations (e.g., taking into account the reply time D).

Also, the possibility of large relative clock drifts may make communicating at lower pulse rates difficult in UWB. Availability of a good estimate of the relative drift may enable low pulse rate communications as the lower rate time tracking loop can start from a very good initial state.

For this discussion, assume that BPPM modulation is used. For each BPPM symbol, there are two possible pulse positions representing '0' and '1'. Denote the energy values collected during the '0' position by $E_0$, $N_0$, and $L_0$ and during the '1' position by $E_1$, $N_1$, and $L_1$. If the tracking loop knows which symbol was transmitted, it can use the corresponding energy values to change the window position. But, knowing the exact symbol may not be possible without decoding and then re-encoding the decision. The following are some possibilities:

If $N_0 > N_1$, use $E = E_0$, $L = L_0$ and vice versa $\qquad$ EQUATION 5

Use $E = E_0 + E_1$, $L = L_0 + L_1$ $\qquad$ EQUATION 6

Use $E = \text{abs}(E_0 - E_1)$, $L = \text{abs}(L_0 - L_1)$ $\qquad$ EQUATION 7

The first method makes a symbol decision on each pulse and may suffer from the effect of pulse errors. If the system operating point has a very high pulse error rate, this method may encounter problems. The last two methods do not need pulse decisions, but may suffer from the presence of additional noise. The performance comparison between the methods depends in some aspects on the system operating conditions and nature of timing errors.

The above algorithm may enable good time tracking of non-coherent low power UWB radios. It also may enable accurate estimation of relative clock drift of the devices establishing a communication link, if necessary.

Figure 10:
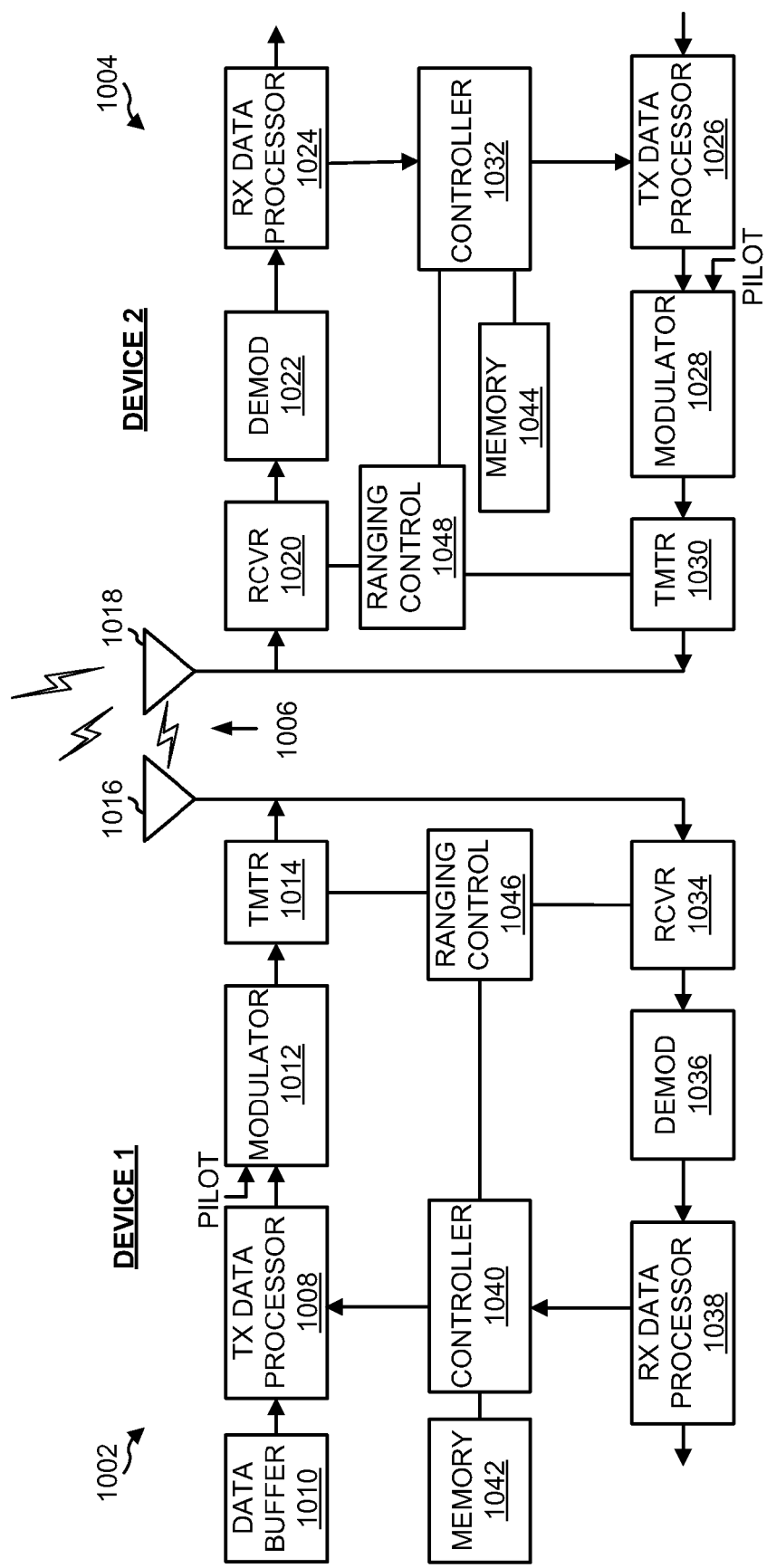
FIG. 10 is a simplified block diagram of several sample aspects of communication components.

The teachings herein may be incorporated into a device employing various components for communicating with at least one other device. FIG. 10 depicts several sample components that may be employed to facilitate communication between devices. Here, a first device 1002 and a second device 1004 are adapted to communicate via a wireless communication link 1006 over a suitable medium.

Initially, components involved in sending information from the device 1002 to the device 1004 (e.g., a reverse link) will be treated. A transmit ("TX") data processor 1008 receives traffic data (e.g., data packets) from a data buffer 1010 or some other suitable component. The transmit data processor 1008 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1012 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1014 processes (e.g., converts to analog, filters, amplifies, and frequency upconverts) the output chip stream and generates a modulated signal, which is then transmitted from an antenna 1016.

The modulated signals transmitted by the device 1002 (along with signals from other devices in communication with the device 1004) are received by an antenna 1018 of the device 1004. A receiver ("RCVR") 1020 processes (e.g., conditions and digitizes) the received signal from the antenna 1018 and provides received samples. A demodulator ("DEMOD") 1022 processes (e.g., demodulates and detects) the received samples and provides detected data symbols, which may be a noisy estimate of the data symbols transmitted to the device 1004 by the other device(s). A receive ("RX") data processor 1024 processes (e.g., symbol demaps, deinterleaves, and decodes) the detected data symbols and provides decoded data associated with each transmitting device (e.g., device 1002).

Components involved in sending information from the device 1004 to the device 1002 (e.g., a forward link) will be now be treated. At the device 1004, traffic data is processed by a transmit ("TX") data processor 1026 to generate data symbols. A modulator 1028 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1030 and transmitted from the antenna 1018. In some implementations signaling for the forward link may include power control commands and other information (e.g., relating to a communication channel) generated by a controller 1032 for all devices (e.g. terminals) transmitting on the reverse link to the device 1004.

At the device 1002, the modulated signal transmitted by the device 1004 is received by the antenna 1016, conditioned and digitized by a receiver ("RCVR") 1034, and processed by a demodulator ("DEMOD") 1036 to obtain detected data symbols. A receive ("RX") data processor 1038 processes the detected data symbols and provides decoded data for the device 1002 and the forward link signaling. A controller 1040 receives power control commands and other information to control data transmission and to control transmit power on the reverse link to the device 1004.

The controllers 1040 and 1032 direct various operations of the device 1002 and the device 1004, respectively. For example, a controller may determine an appropriate filter, reporting information about the filter, and decode information using a filter. Data memories 1042 and 1044 may store program codes and data used by the controllers 1040 and 1032, respectively.

FIG. 10 also illustrates that the communication components may include one or more components that perform ranging operations as taught herein. For example, a ranging control component 1046 may cooperate with the controller 1040 and/or other components of the device 1002 to send/receive signals to/from another device (e.g., device 1004). Similarly, a ranging control component 1048 may cooperate with the controller 1032 and/or other components of the device 1004 to send/receive signals to/from another device (e.g., device 1002). It should be appreciated that for each device 1002 and 1004 the functionality of two or more of the described components may be provided by a single component. For example, a single processing component may provide the functionality of the ranging control component 1046 and the controller 1040 and a single processing component may provide the functionality of the ranging control component 1048 and the controller 1032.

A wireless device may include various components that perform functions based on signals that are transmitted by or received at the wireless device. For example, a wireless headset may include a transducer adapted to provide an indication based on a determined distance and/or provide audio output based on data received via a receiver. A wireless watch may include a user interface adapted to provide an indication based on a determined distance and/or data received via a receiver. A wireless sensing device may include a sensor adapted to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 610 or 614 and receiver 612 or 616) that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 12:
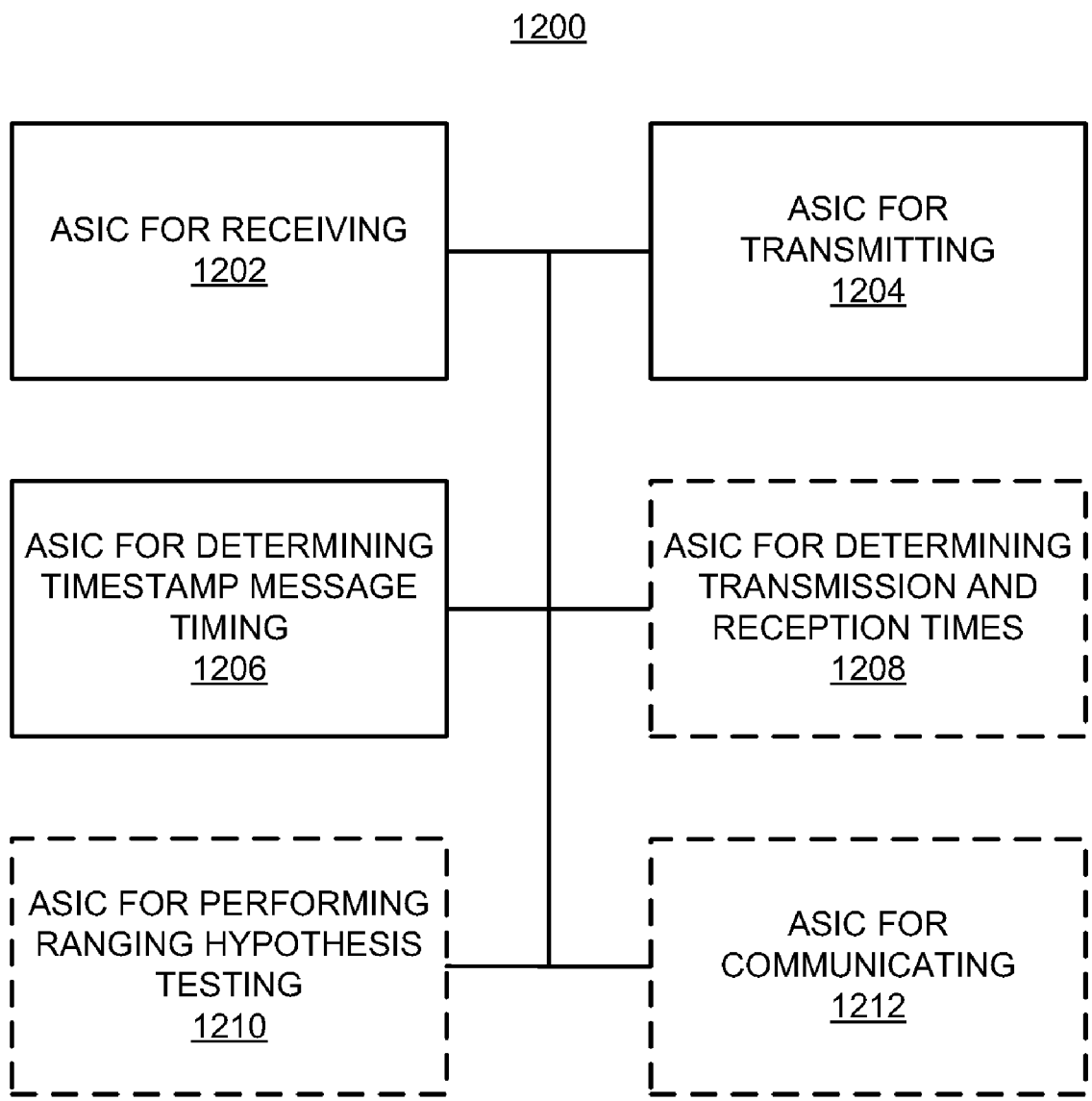

The components described herein may be implemented in a variety of ways. Referring to FIGS. 10 and 12, apparatuses 1000 and 1200 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1100 and 1200 may include one or more modules that may perform one or more of the functions described above with regard to various figures. For example, an ASIC for transmitting 1102 may correspond to, for example, a transmitter as discussed herein. An ASIC for receiving 1104 may correspond to, for example, a receiver as discussed herein. An ASIC for determining a distance 1106 may correspond to, for example, a distance determiner as discussed herein. An ASIC for determining transmission and reception times 1108 may correspond to, for example, a communication controller as discussed herein. An ASIC for performing ranging hypothesis testing 1110 may correspond to, for example, a hypothesis processor as discussed herein. An ASIC for communicating 1112 may correspond to, for example, a communication controller as discussed herein. An ASIC for receiving 1202 may correspond to, for example, a receiver as discussed herein. An ASIC for transmitting 1204 may correspond to, for example, a transmitter as discussed herein. An ASIC for determining timestamp message timing 1206 may correspond to, for example, a timestamp processor as discussed herein. An ASIC for determining transmission and reception times 1208 may correspond to, for example, a communication controller as discussed herein. An ASIC for performing ranging hypothesis testing 1210 may correspond to, for example, a hypothesis processor as discussed herein. An ASIC for communicating 1212 may correspond to, for example, a communication controller as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1100 and 1200 may comprise one or more integrated circuits. For example, in some aspects a single integrated circuit may implement the functionality of one or more of the illustrated components, while in other aspects more than one integrated circuit may implement the functionality of one or more of the illustrated components.

Figure 11:
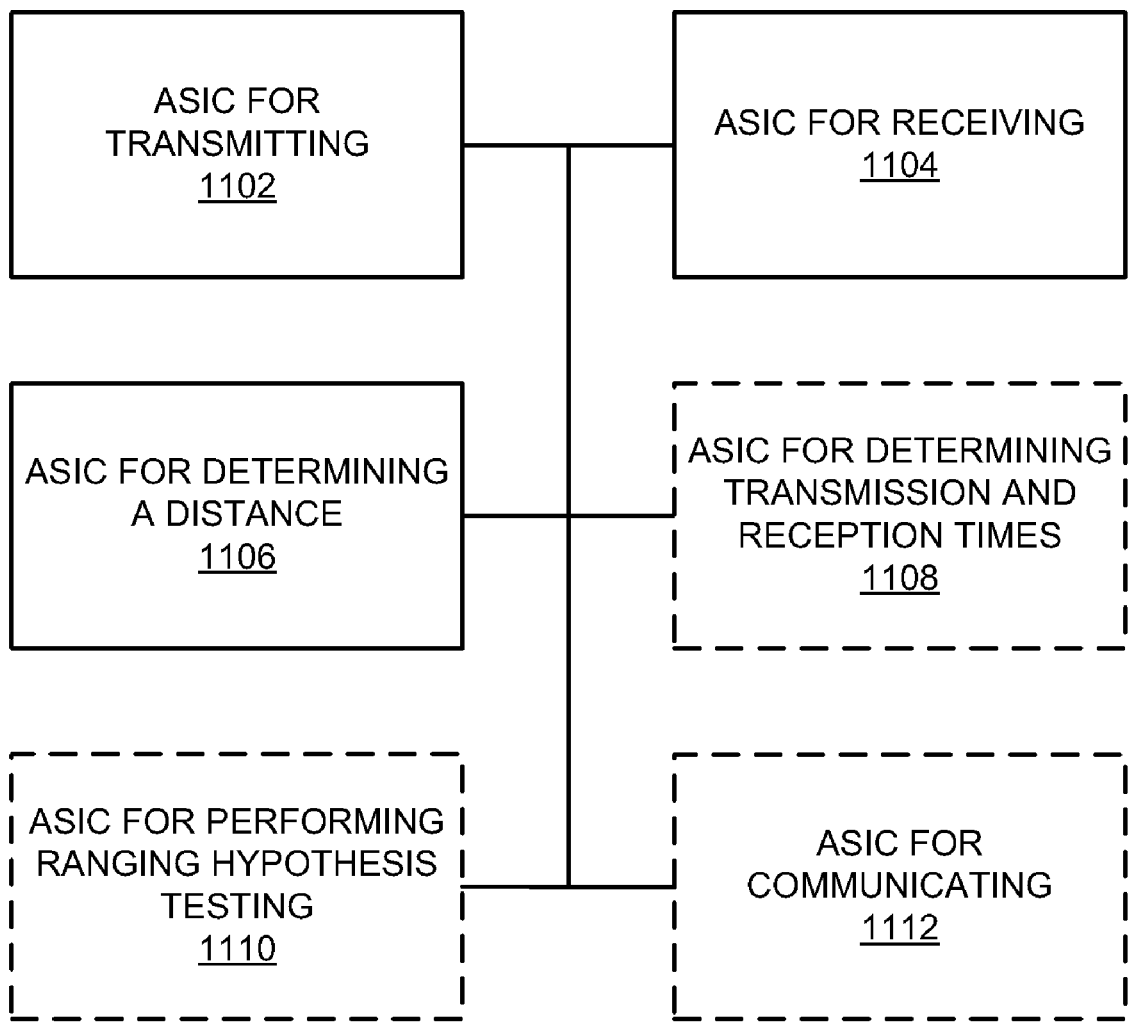
FIGS. 11 and 12 are simplified block diagrams of several sample aspects of apparatuses configured to provide two-way ranging as taught herein.

In addition, the components and functions represented by FIGS. 11 and 12 as well as other components and functions described herein, may be implemented using any suitable means. Such means also may be implemented, at least in part, using corresponding structure as taught herein. For example, the components described above in conjunction with the "ASIC for" components of FIGS. 11 and 12 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second,"

and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof"

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    transmitting, by a first node, a first set of pulses;
    receiving, at the first node, a second set of pulses, wherein at least one pulse of the second set is received after at least one pulse of the first set is transmitted and before at least one other pulse of the first set is transmitted; and
    determining a distance between the first node and a second node based on at least some of the pulses of the first set and at least some of the pulses of the second set, wherein:
    the first node receives at least a portion of a ranging preamble associated with the second set of pulses before transmitting an entire ranging preamble associated with the first set of pulses, and
    the determination of the distance is further based on the ranging preamble associated with the first set of pulses and the ranging preamble associated with the second set of pulses.

2. The method of claim 1, further comprising determining transmission times for the first set of pulses and reception times for the second set of pulses such that at least a portion of the pulses of the first set are interleaved in time with at least a portion of the pulses of the second set.

3. The method of claim 2, wherein the first node alternates between transmitting a given pulse of the first set and receiving a given pulse of the second set based on the determined transmission times and receptions times.

4. The method of claim 1, further comprising determining ranging message timing such that the first node receives at least a portion of a ranging message associated with the second set of pulses before transmitting an entire ranging message associated with the first set of pulses.

5. The method of claim 1, wherein the first node performs ranging hypothesis testing based on the second set of pulses while transmitting the first set of pulses for the second node to perform ranging hypothesis testing.

6. The method of claim 1, wherein the determination of the distance further comprises:
   determining a period of time based on a first timestamp associated with the transmission of the first set of pulses and a second timestamp associated with the receipt of the second set of pulses; and
   subtracting a defined delay period from the period of time, wherein the defined delay period specifies a time at which the second node is to transmit a timing indication via the second set of pulses after receiving a timing indication via the first set of pulses.

7. The method of claim 6, wherein the defined delay period is approximately equal to a symbol duration time.

8. The method of claim 6, wherein the defined delay period is specified by a symbol index.

9. The method of claim 1, wherein the determination of the distance further comprises determining a leading edge of the second set of pulses.

10. The method of claim 1, wherein the first node transmits the first set of pulses a defined delay period after transmitting an acquisition message.

11. The method of claim 1, further comprising communicating with the second node to establish transmission timing for at least one ranging message.

12. The method of claim 1, wherein each of the pulses of the first set has a pulse duration of four nanoseconds or less.

13. An apparatus for wireless communication, comprising:
   a transmitter configured to transmit a first set of pulses;
   a receiver configured to receive a second set of pulses, and further configured to receive at least one pulse of the second set after the transmitter transmits at least one pulse of the first set and before the transmitter transmits at least one other pulse of the first set; and
   a distance determiner configured to determine a distance between the apparatus and a node based on at least some of the pulses of the first set and at least some of the pulses of the second set, wherein the distance determiner is further configured to:
   determine timestamp message timing such that the receiver receives at least a portion of a ranging preamble associated with the second set of pulses before the transmitter transmits an entire ranging preamble associated with the first set of pulses, and
   determine the distance based on the ranging preamble associated with the first set of pulses and the ranging preamble associated with the second set of pulses.

14. The apparatus of claim 13, further comprising a communication controller configured to determine transmission times for the first set of pulses and reception times for the second set of pulses such that at least a portion of the pulses of the first set are interleaved in time with at least a portion of the pulses of the second set.

15. The apparatus of claim 14, wherein the transmitter and the receiver are further configured to alternate between transmitting a given pulse of the first set and receiving a given pulse of the second set based on the determined transmission times and receptions times.

16. The apparatus of claim 13, wherein the distance determiner is further configured to determine ranging message timing such that the receiver receives at least a portion of a ranging message associated with the second set of pulses before the transmitter transmits an entire ranging message associated with the first set of pulses.

17. The apparatus of claim 13, further comprising a hypothesis processor configured to perform ranging hypothesis testing based on the second set of pulses while the transmitter transmits the first set of pulses for the node to perform ranging hypothesis testing.

18. The apparatus of claim 13, wherein the distance determiner is further configured to determine the distance by:
   determining a period of time based on a first timestamp associated with the transmission of the first set of pulses and a second timestamp associated with the receipt of the second set of pulses; and
   subtracting a defined delay period from the period of time, wherein the defined delay period specifies a time at which the node is to transmit a timing indication via the second set of pulses after receiving a timing indication via the first set of pulses.

19. The apparatus of claim 18, wherein the defined delay period is approximately equal to a symbol duration time.

20. The apparatus of claim 18, wherein the defined delay period is specified by a symbol index.

21. The apparatus of claim 13, wherein the distance determiner is further configured to determine the distance by determining a leading edge of the second set of pulses.

22. The apparatus of claim 13, wherein the distance determiner is further configured to determine ranging message timing such that the transmitter transmits the first set of pulses a defined delay period after the transmitter transmits an acquisition message.

23. The apparatus of claim 13, further comprising a communication controller configured to communicate with the node to establish transmission timing for at least one ranging message.

24. The apparatus of claim 13, wherein each of the pulses of the first set has a pulse duration of four nanoseconds or less.

25. An apparatus for wireless communication, comprising:
   means for transmitting a first set of pulses;
   means for receiving a second set of pulses, wherein the means for receiving is configured to receive at least one pulse of the second set after the means for transmitting transmits at least one pulse of the first set and before the means for transmitting transmits at least one other pulse of the first set; and
   means for determining a distance between the apparatus and a node based on at least some of the pulses of the first set and at least some of the pulses of the second set, wherein the means for determining is configured to:
   determine timestamp message timing such that the means for receiving receives at least a portion of a ranging preamble associated with the second set of pulses before the means for transmitting transmits an entire ranging preamble associated with the first set of pulses, and
   determine the distance based on the ranging preamble associated with the first set of pulses and the ranging preamble associated with the second set of pulses.

26. The apparatus of claim 25, further comprising means for determining transmission times for the first set of pulses and reception times for the second set of pulses such that at least a portion of the pulses of the first set are interleaved in time with at least a portion of the pulses of the second set.

27. The apparatus of claim 26, wherein the means for transmitting and the means for receiving are further configured to alternate between transmitting a given pulse of the first set and receiving a given pulse of the second set based on the determined transmission times and receptions times.

28. The apparatus of claim 25, wherein the means for determining is configured to determine ranging message timing such that the means for receiving receives at least a portion of a ranging message associated with the second set of pulses before the means for transmitting transmits an entire ranging message associated with the first set of pulses.

29. The apparatus of claim 25, further comprising means for performing ranging hypothesis testing based on the second set of pulses while the means for transmitting transmits the first set of pulses for the node to perform ranging hypothesis testing.

30. The apparatus of claim 25, wherein the means for determining is further configured to determine the distance by:
   determining a period of time based on a first timestamp associated with the transmission of the first set of pulses and a second timestamp associated with the receipt of the second set of pulses; and
   subtracting a defined delay period from the period of time, wherein the defined delay period specifies a time at which the node is to transmit a timing indication via the second set of pulses after receiving a timing indication via the first set of pulses.

31. The apparatus of claim 30, wherein the defined delay period is approximately equal to a symbol duration time.

32. The apparatus of claim 30, wherein the defined delay period is specified by a symbol index.

33. The apparatus of claim 25, wherein the means for determining is configured to determine the distance by determining a leading edge of the second set of pulses.

34. The apparatus of claim 25, wherein the means for determining is configured to determine ranging message timing such that the means for transmitting transmits the first set of pulses a defined delay period after the means for transmitting transmits an acquisition message.

35. The apparatus of claim 25, further comprising means for communicating with the node to establish transmission timing for at least one ranging message.

36. The apparatus of claim 25, wherein each of the pulses of the first set has a pulse duration of four nanoseconds or less.

37. A computer-program product for wireless communication, comprising:
   non-transitory computer-readable medium encoded with codes executable to:
   transmit, at a first node, a first set of pulses;
   receive, at the first node, a second set of pulses, wherein at least one pulse of the second set is received after at least one pulse of the first set is transmitted and before at least one other pulse of the first set is transmitted;
   determine a distance between the first node and a second node based on at least some of the pulses of the first set and at least some of the pulses of the second set, wherein:
   the first node receives at least a portion of a ranging preamble associated with the second set of pulses before transmitting an entire ranging preamble associated with the first set of pulses; and
   the determination of the distance is further based on the ranging preamble associated with the first set of pulses and the ranging preamble associated with the second set of pulses.

38. A headset, comprising:
   a transmitter configured to transmit a first set of pulses;
   a receiver configured to receive a second set of pulses, and further configured to receive at least one pulse of the second set after the transmitter transmits at least one pulse of the first set and before the transmitter transmits at least one other pulse of the first set;
   a distance determiner configured to determine a distance between the headset and a node based on at least some of the pulses of the first set and at least some of the pulses of the second set, wherein the distance determiner is further configured to:
   determine timestamp message timing such that the receiver receives at least a portion of a ranging preamble associated with the second set of pulses before the transmitter transmits an entire ranging preamble associated with the first set of pulses, and
   determine the distance based on the ranging preamble associated with the first set of pulses and the ranging preamble associated with the second set of pulses; and
   a transducer configured to provide an indication based on the determined distance.

39. A watch, comprising:
   a transmitter configured to transmit a first set of pulses;
   a receiver configured to receive a second set of pulses, and further configured to receive at least one pulse of the second set after the transmitter transmits at least one pulse of the first set and before the transmitter transmits at least one other pulse of the first set;
   a distance determiner configured to determine a distance between the watch and a node based on at least some of the pulses of the first set and at least some of the pulses of the second set, wherein the distance determiner is further configured to:
   determine timestamp message timing such that the receiver receives at least a portion of a ranging preamble associated with the second set of pulses before the transmitter transmits an entire ranging preamble associated with the first set of pulses, and
   determine the distance based on the ranging preamble associated with the first set of pulses and the ranging preamble associated with the second set of pulses; and
   a user interface configured to provide an indication based on based on the determined distance.

40. A sensing device, comprising:
   a transmitter configured to transmit a first set of pulses;
   a receiver configured to receive a second set of pulses, and further configured to receive at least one pulse of the second set after the transmitter transmits at least one pulse of the first set and before the transmitter transmits at least one other pulse of the first set;
   a distance determiner configured to determine a distance between the sensing device and a node based on at least some of the pulses of the first set and at least some of the pulses of the second set, wherein the distance determiner is further configured to:
   determine timestamp message timing such that the receiver receives at least a portion of a ranging preamble associated with the second set of pulses before the transmitter transmits an entire ranging preamble associated with the first set of pulses, and
   determine the distance based on the ranging preamble associated with the first set of pulses and the ranging preamble associated with the second set of pulses; and
   a sensor configured to provide data to be transmitted via the transmitter.

41. A method of wireless communication, comprising:
   receiving, at a first node, a first set of pulses associated with a ranging operation; and
   transmitting, by the first node, a second set of pulses associated with the ranging operation, wherein:
   at least one pulse of the second set is transmitted after at least one pulse of the first set is received and before at least one other pulse of the first set is received, at least a portion of a ranging preamble associated with the second set of pulses is transmitted before receiving an entire ranging preamble associated with the first set of pulses, the second set of pulses comprises a timestamped pulse, and the timestamped pulse is transmitted a defined delay period after receipt of a timing indication associated with the first set of pulses.

42. The method of claim 41, further comprising determining transmission times for the second set of pulses and reception times for the first set of pulses such that at least a portion of the pulses of the first set are interleaved in time with at least a portion of the pulses of the second set.

43. The method of claim 42, wherein the first node alternates between receiving a given pulse of the first set and transmitting a given pulse of the second set as a result of the determined transmission times and receptions times.

44. The method of claim 41, further comprising determining ranging message timing such that the first node transmits at least a portion of a ranging message associated with the second set of pulses before receiving an entire ranging message associated with the first set of pulses.

45. The method of claim 41, wherein the first node performs ranging hypothesis testing based on the first set of pulses while transmitting the second set of pulses for a second node to perform ranging hypothesis testing.

46. The method of claim 41, wherein the defined delay period is approximately equal to a symbol duration time.

47. The method of claim 41, wherein the defined delay period is specified by a symbol index.

48. The method of claim 41, wherein the timestamped pulse is transmitted the defined delay period after receipt of a leading edge of the timing indication.

49. The method of claim 41, wherein the first node transmits the second set of pulses a defined period of time after transmitting an acquisition message.

50. The method of claim 41, further comprising communicating with a second node to establish transmission timing for at least one ranging message.

51. The method of claim 41, wherein each of the pulses of the second set has a pulse duration of four nanoseconds or less.

52. An apparatus for wireless communication, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse; and
a timestamp processor configured to determine timestamp message timing such that the transmitter transmits the timestamped pulse a defined delay period after the receiver receives a timing indication associated with the first set of pulses, wherein the timestamp processor is further configured to determine the timestamp message timing such that the transmitter transmits at least a portion of a ranging preamble associated with the second set of pulses before the receiver receives an entire ranging preamble associated with the first set of pulses.

53. The apparatus of claim 52, further comprising a communication controller configured to determine transmission times for the second set of pulses and reception times for the first set of pulses such that at least a portion of the pulses of the first set are interleaved in time with at least a portion of the pulses of the second set.

54. The apparatus of claim 53, wherein the transmitter and the receiver are further configured to alternate between receiving a given pulse of the first set and transmitting a given pulse of the second set based on the determined transmission times and receptions times.

55. The apparatus of claim 52, wherein the timestamp processor is further configured to determine ranging message timing such that the transmitter transmits at least a portion of a ranging message associated with the second set of pulses before the receiver receives an entire ranging message associated with the first set of pulses.

56. The apparatus of claim 52, further comprising a hypothesis processor configured to perform ranging hypothesis testing based on the first set of pulses while the transmitter transmits the second set of pulses for a node to perform ranging hypothesis testing.

57. The apparatus of claim 52, wherein the defined delay period is approximately equal to a symbol duration time.

58. The apparatus of claim 52, wherein the defined delay period is specified by a symbol index.

59. The apparatus of claim 52, wherein the timestamp processor is further configured to determine timestamp message timing such that the transmitter transmits the timestamped pulse the defined delay period after the receiver receives a leading edge of the timing indication.

60. The apparatus of claim 52, wherein the timestamp processor is further configured to determine ranging message timing such that the transmitter transmits the second set of pulses a defined period of time after the transmitter transmits an acquisition message.

61. The apparatus of claim 52, further comprising a communication controller configured to communicate with a node to establish transmission timing for at least one ranging message.

62. The apparatus of claim 52, wherein each of the pulses of the second set has a pulse duration of four nanoseconds or less.

63. An apparatus for wireless communication, comprising:
means for receiving a first set of pulses associated with a ranging operation;
means for transmitting a second set of pulses associated with the ranging operation, wherein the means for transmitting is configured to transmit at least one pulse of the second set after the means for receiving receives at least one pulse of the first set and before the means for receiving receives at least one other pulse of the first set, and further wherein the second set of pulses comprises a timestamped pulse; and
means for determining timestamp message timing such that the means for transmitting transmits the timestamped pulse a defined delay period after the means for receiving receives a timing indication associated with the first set of pulses, wherein the means for determining is configured to determine the timestamp message timing such that the means for transmitting transmits at least a portion of a ranging preamble associated with the second set of pulses before the means for receiving receives an entire ranging preamble associated with the first set of pulses.

64. The apparatus of claim 63, further comprising means for determining transmission times for the second set of pulses and reception times for the first set of pulses such that at least a portion of the pulses of the first set are interleaved in time with at least a portion of the pulses of the second set.

65. The apparatus of claim 64, wherein the means for transmitting and the means for receiving are further configured to alternate between receiving a given pulse of the first set and transmitting a given pulse of the second set based on the determined transmission times and receptions times.

66. The apparatus of claim 63, wherein the means for determining is configured to determine ranging message timing such that the means for transmitting transmits at least a portion of a ranging message associated with the second set of pulses before the means for receiving receives an entire ranging message associated with the first set of pulses.

67. The apparatus of claim 63, further comprising means for performing ranging hypothesis testing based on the first set of pulses while the means for transmitting transmits the second set of pulses for a node to perform ranging hypothesis testing.

68. The apparatus of claim 63, wherein the defined delay period is approximately equal to a symbol duration time.

69. The apparatus of claim 63, wherein the defined delay period is specified by a symbol index.

70. The apparatus of claim 63, wherein the means for determining is configured to determine timestamp message timing such that the means for transmitting transmits the timestamped pulse the defined delay period after the means for receiving receives a leading edge of the timing indication.

71. The apparatus of claim 63, wherein the means for determining is configured to determine timestamp message timing such that the means for transmitting transmits the second set of pulses a defined period of time after the means for transmitting transmits an acquisition message.

72. The apparatus of claim 63, further comprising means for communicating with a node to establish transmission timing for at least one ranging message.

73. The apparatus of claim 63, wherein each of the pulses of the second set has a pulse duration of four nanoseconds or less.

74. A computer-program product for wireless communication, comprising:
non-transitory computer-readable medium encoded with codes executable to:
receive, at a first node, a first set of pulses associated with a ranging operation;
transmit, at the first node, a second set of pulses associated with the ranging operation, wherein at least one pulse of the second set is transmitted after at least one pulse of the first set is received and before at least one other pulse of the first set is received, and wherein at least a portion of a ranging preamble associated with the second set of pulses is transmitted before receiving an entire ranging preamble associated with the first set of pulses, and further wherein the second set of pulses comprises a timestamped pulse; and
determine timestamp message timing such that the timestamped pulse is transmitted a defined delay period after receipt of a timing indication associated with the first set of pulses.

75. A headset, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse;

a timestamp processor configured to determine timestamp message timing such that the transmitter transmits the timestamped pulse a defined delay period after the receiver receives a timing indication associated with the first set of pulses, wherein the timestamp processor is further configured to determine the timestamp message timing such that the transmitter transmits at least a portion of a ranging preamble associated with the second set of pulses before the receiver receives an entire ranging preamble associated with the first set of pulses; and
a transducer configured to provide an audio output based on data received via the receiver.

76. A watch, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse;
a timestamp processor configured to determine timestamp message timing such that the transmitter transmits the timestamped pulse a defined delay period after the receiver receives a timing indication associated with the first set of pulses, wherein the timestamp processor is further configured to determine the timestamp message timing such that the transmitter transmits at least a portion of a ranging preamble associated with the second set of pulses before the receiver receives an entire ranging preamble associated with the first set of pulses; and
a user interface configured to provide an indication based on data received via the receiver.

77. A sensing device, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse;
a timestamp processor configured to determine timestamp message timing such that the transmitter transmits the timestamped pulse a defined delay period after the receiver receives a timing indication associated with the first set of pulses, wherein the timestamp processor is further configured to determine the timestamp message timing such that the transmitter transmits at least a portion of a ranging preamble associated with the second set of pulses before the receiver receives an entire ranging preamble associated with the first set of pulses; and
a sensor configured to provide data to be transmitted via the transmitter.

78. A method of wireless communication, comprising:
transmitting, by a first node, a first set of pulses;
receiving, at the first node, a second set of pulses, wherein at least one pulse of the second set is received after at least one pulse of the first set is transmitted and before at least one other pulse of the first set is transmitted; and
determining a distance between the first node and a second node based on at least some of the pulses of the first set and at least some of the pulses of the second set, wherein:

the first node performs ranging hypothesis testing based on the second set of pulses while transmitting the first set of pulses for the second node to perform ranging hypothesis testing.

79. A method of wireless communication, comprising:
transmitting, by a first node, a first set of pulses;
receiving, at the first node, a second set of pulses, wherein at least one pulse of the second set is received after at least one pulse of the first set is transmitted and before at least one other pulse of the first set is transmitted; and
determining a distance between the first node and a second node based on at least some of the pulses of the first set and at least some of the pulses of the second set, wherein the determination of the distance further comprises:
determining a period of time based on a first timestamp associated with the transmission of the first set of pulses and a second timestamp associated with the receipt of the second set of pulses, and
subtracting a defined delay period from the period of time, wherein the defined delay period specifies a time at which the second node is to transmit a timing indication via the second set of pulses after receiving a timing indication via the first set of pulses.

80. The method of claim 79, wherein the defined delay period is approximately equal to a symbol duration time.

81. The method of claim 79, wherein the defined delay period is specified by a symbol index.

82. An apparatus for wireless communication, comprising:
a transmitter configured to transmit a first set of pulses;
a receiver configured to receive a second set of pulses, and further configured to receive at least one pulse of the second set after the transmitter transmits at least one pulse of the first set and before the transmitter transmits at least one other pulse of the first set;
a distance determiner configured to determine a distance between the apparatus and a node based on at least some of the pulses of the first set and at least some of the pulses of the second set; and
a hypothesis processor configured to perform ranging hypothesis testing based on the second set of pulses while the transmitter transmits the first set of pulses for the node to perform ranging hypothesis testing.

83. An apparatus for wireless communication, comprising:
a transmitter configured to transmit a first set of pulses;
a receiver configured to receive a second set of pulses, and further configured to receive at least one pulse of the second set after the transmitter transmits at least one pulse of the first set and before the transmitter transmits at least one other pulse of the first set; and
a distance determiner configured to determine a distance between the apparatus and a node based on at least some of the pulses of the first set and at least some of the pulses of the second set, wherein the distance determiner is further configured to determine the distance by:
determining a period of time based on a first timestamp associated with the transmission of the first set of pulses and a second timestamp associated with the receipt of the second set of pulses, and
subtracting a defined delay period from the period of time, wherein the defined delay period specifies a time at which the node is to transmit a timing indication via the second set of pulses after receiving a timing indication via the first set of pulses.

84. The apparatus of claim 82, wherein the defined delay period is approximately equal to a symbol duration time.

85. The apparatus of claim 83, wherein the defined delay period is specified by a symbol index.

86. An apparatus for wireless communication, comprising:
means for transmitting a first set of pulses;
means for receiving a second set of pulses, wherein the means for receiving is configured to receive at least one pulse of the second set after the means for transmitting transmits at least one pulse of the first set and before the means for transmitting transmits at least one other pulse of the first set;
means for determining a distance between the apparatus and a node based on at least some of the pulses of the first set and at least some of the pulses of the second set; and
means for performing ranging hypothesis testing based on the second set of pulses while the means for transmitting transmits the first set of pulses for the node to perform ranging hypothesis testing.

87. An apparatus for wireless communication, comprising:
means for transmitting a first set of pulses;
means for receiving a second set of pulses, wherein the means for receiving is configured to receive at least one pulse of the second set after the means for transmitting transmits at least one pulse of the first set and before the means for transmitting transmits at least one other pulse of the first set; and
means for determining a distance between the apparatus and a node based on at least some of the pulses of the first set and at least some of the pulses of the second set, wherein the means for determining is further configured to determine the distance by:
determining a period of time based on a first timestamp associated with the transmission of the first set of pulses and a second timestamp associated with the receipt of the second set of pulses, and
subtracting a defined delay period from the period of time, wherein the defined delay period specifies a time at which the node is to transmit a timing indication via the second set of pulses after receiving a timing indication via the first set of pulses.

88. The apparatus of claim 87, wherein the defined delay period is approximately equal to a symbol duration time.

89. The apparatus of claim 87, wherein the defined delay period is specified by a symbol index.

90. A method of wireless communication, comprising:
receiving, at a first node, a first set of pulses associated with a ranging operation; and
transmitting, by the first node, a second set of pulses associated with the ranging operation, wherein:
at least one pulse of the second set is transmitted after at least one pulse of the first set is received and before at least one other pulse of the first set is received,
the second set of pulses comprises a timestamped pulse,
the timestamped pulse is transmitted a defined delay period after receipt of a timing indication associated with the first set of pulses, and
the first node performs ranging hypothesis testing based on the first set of pulses while transmitting the second set of pulses for a second node to perform ranging hypothesis testing.

91. The method of claim 90 wherein the defined delay period is approximately equal to a symbol duration time.

92. A method of wireless communication, comprising:
receiving, at a first node, a first set of pulses associated with a ranging operation; and
transmitting, by the first node, a second set of pulses associated with the ranging operation, wherein:
at least one pulse of the second set is transmitted after at least one pulse of the first set is received and before at least one other pulse of the first set is received, the second set of pulses comprises a timestamped pulse,
the timestamped pulse is transmitted a defined delay period after receipt of a timing indication associated with the first set of pulses, and
the defined delay period is specified by a symbol index.

93. An apparatus for wireless communication, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse; and
a timestamp processor configured to determine timestamp message timing such that the transmitter transmits the timestamped pulse a defined delay period after the receiver receives a timing indication associated with the first set of pulses, wherein the timestamp processor is further configured to determine ranging message timing such that the transmitter transmits at least a portion of a ranging message associated with the second set of pulses before the receiver receives an entire ranging message associated with the first set of pulses.

94. An apparatus for wireless communication, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse;
a timestamp processor configured to determine timestamp message timing such that the transmitter transmits the timestamped pulse a defined delay period after the receiver receives a timing indication associated with the first set of pulses; and
a hypothesis processor configured to perform ranging hypothesis testing based on the first set of pulses while the transmitter transmits the second set of pulses for a node to perform ranging hypothesis testing.

95. The apparatus of claim 94, wherein the defined delay period is approximately equal to a symbol duration time.

96. An apparatus for wireless communication, comprising:
a receiver configured to receive a first set of pulses associated with a ranging operation;
a transmitter configured to transmit a second set of pulses associated with the ranging operation, wherein the transmitter is further configured to transmit at least one pulse of the second set after the receiver receives at least one pulse of the first set and before the receiver receives at least one other pulse of the first set, and further wherein the second set of pulses comprises a timestamped pulse; and
a timestamp processor configured to determine timestamp message timing such that the transmitter transmits the timestamped pulse a defined delay period after the receiver receives a timing indication associated with the first set of pulses, wherein the defined delay period is specified by a symbol index.

97. An apparatus for wireless communication, comprising:
means for receiving a first set of pulses associated with a ranging operation;
means for transmitting a second set of pulses associated with the ranging operation, wherein the means for transmitting is configured to transmit at least one pulse of the second set after the means for receiving receives at least one pulse of the first set and before the means for receiving receives at least one other pulse of the first set, and further wherein the second set of pulses comprises a timestamped pulse;
means for determining timestamp message timing such that the means for transmitting transmits the timestamped pulse a defined delay period after the means for receiving receives a timing indication associated with the first set of pulses; and
means for performing ranging hypothesis testing based on the first set of pulses while the means for transmitting transmits the second set of pulses for a node to perform ranging hypothesis testing.

98. The apparatus of claim 97, wherein the defined delay period is approximately equal to a symbol duration time.

99. An apparatus for wireless communication, comprising:
means for receiving a first set of pulses associated with a ranging operation;
means for transmitting a second set of pulses associated with the ranging operation, wherein the means for transmitting is configured to transmit at least one pulse of the second set after the means for receiving receives at least one pulse of the first set and before the means for receiving receives at least one other pulse of the first set, and further wherein the second set of pulses comprises a timestamped pulse; and
means for determining timestamp message timing such that the means for transmitting transmits the timestamped pulse a defined delay period after the means for receiving receives a timing indication associated with the first set of pulses, wherein the defined delay period is specified by a symbol index.

100. A computer-program product for wireless communication, comprising:
non-transitory computer-readable medium encoded with codes executable to:
transmit, at a first node, a first set of pulses;
receive, at the first node, a second set of pulses, wherein at least one pulse of the second set is received after at least one pulse of the first set is transmitted and before at least one other pulse of the first set is transmitted;
determine a distance between the first node and a second node based on at least some of the pulses of the first set and at least some of the pulses of the second set; and
perform ranging hypothesis testing based on the second set of pulses while transmitting the first set of pulses for the second node to perform ranging hypothesis testing.

101. A computer-program product for wireless communication, comprising:
non-transitory computer-readable medium encoded with codes executable to:
transmit, at a first node, a first set of pulses;
receive, at the first node, a second set of pulses, wherein at least one pulse of the second set is received after at least one pulse of the first set is transmitted and before at least one other pulse of the first set is transmitted; and
determine a distance between the first node and a second node based on at least some of the pulses of the first set and at least some of the pulses of the second set, wherein the determination of the distance further comprises:
determining a period of time based on a first timestamp associated with the transmission of the first set of pulses and a second timestamp associated with the receipt of the second set of pulses, and subtracting a defined delay period from the period of time, wherein the defined delay period specifies a time at which the second node is to transmit a timing indication via the second set of pulses after receiving a timing indication via the first set of pulses.

102. A computer-program product for wireless communication, comprising:

non-transitory computer-readable medium encoded with codes executable to:

receive, at a first node, a first set of pulses associated with a ranging operation;

transmit, at the first node, a second set of pulses associated with the ranging operation, wherein at least one pulse of the second set is transmitted after at least one pulse of the first set is received and before at least one other pulse of the first set is received, and further wherein the second set of pulses comprises a timestamped pulse;

determine timestamp message timing such that the timestamped pulse is transmitted a defined delay period after receipt of a timing indication associated with the first set of pulses; and perform ranging hypothesis testing based on the first set of pulses while transmitting the second set of pulses for a second node to perform ranging hypothesis testing.

103. A computer-program product for wireless communication, comprising:

non-transitory computer-readable medium encoded with codes executable to:

receive, at a first node, a first set of pulses associated with a ranging operation;

transmit, at the first node, a second set of pulses associated with the ranging operation, wherein at least one pulse of the second set is transmitted after at least one pulse of the first set is received and before at least one other pulse of the first set is received, and further wherein the second set of pulses comprises a timestamped pulse; and determine timestamp message timing such that the timestamped pulse is transmitted a defined delay period after receipt of a timing indication associated with the first set of pulses, wherein the defined delay period is specified by a symbol index.

104. A computer-program product for wireless communication, comprising:

non-transitory computer-readable medium encoded with codes executable to:

receive, at a first node, a first set of pulses associated with a ranging operation;

transmit, at the first node, a second set of pulses associated with the ranging operation, wherein at least one pulse of the second set is transmitted after at least one pulse of the first set is received and before at least one other pulse of the first set is received, and further wherein the second set of pulses comprises a timestamped pulse;

determine timestamp message timing such that the timestamped pulse is transmitted a defined delay period after receipt of a timing indication associated with the first set of pulses; and determine ranging message timing such that at least a portion of a ranging message associated with the second set of pulses is transmitted before receipt of an entire ranging message associated with the first set of pulses.

\* \* \* \* \*